(12) United States Patent
Christianson et al.

(10) Patent No.: US 9,462,787 B2
(45) Date of Patent: *Oct. 11, 2016

(54) PUZZLE PET TOY AND TREAT DISPENSER

(71) Applicants: Tristan M Christianson, San Francisco, CA (US); Gregory Snyder, Novato, CA (US)

(72) Inventors: Tristan M Christianson, San Francisco, CA (US); Gregory Snyder, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,761

(22) Filed: Aug. 11, 2015

(65) Prior Publication Data
US 2015/0342145 A1 Dec. 3, 2015

Related U.S. Application Data

(63) Continuation-in-part of application No. 14/229,895, filed on Mar. 29, 2014, now Pat. No. 9,288,969.

(60) Provisional application No. 61/903,273, filed on Nov. 12, 2013.

(51) Int. Cl.
| | | |
|---|---|---|
| *A01K 15/00* | (2006.01) | |
| *A01K 15/02* | (2006.01) | |
| *A01K 29/00* | (2006.01) | |
| *H04W 4/00* | (2009.01) | |
| *A01K 5/01* | (2006.01) | |
| *A01K 5/02* | (2006.01) | |

(52) U.S. Cl.
CPC ........... *A01K 15/025* (2013.01); *A01K 5/0114* (2013.01); *A01K 5/0275* (2013.01); *A01K 5/0291* (2013.01); *A01K 15/021* (2013.01); *A01K 29/00* (2013.01); *H04W 4/008* (2013.01)

(58) Field of Classification Search
CPC .......................... A01K 15/025; A01K 15/026
USPC ......................................................... 119/707
See application file for complete search history.

(56) References Cited

U.S. PATENT DOCUMENTS

| | | | |
|---|---|---|---|
| 2011/0226187 A1* | 9/2011 | Bertsch ................ | A01K 5/0114 119/61.55 |
| 2012/0160176 A1* | 6/2012 | Murphy ............... | A01K 5/0114 119/57.1 |
| 2013/0055965 A1* | 3/2013 | Valle .................... | A01K 15/025 119/710 |
| 2014/0373788 A1* | 12/2014 | Ragonetti ............ | A01K 15/025 119/51.01 |
| 2015/0101546 A1* | 4/2015 | Simon .................. | A01K 15/025 119/710 |

* cited by examiner

*Primary Examiner* — Monica Williams
*Assistant Examiner* — Aaron Rodziwicz

(57) ABSTRACT

A puzzle pet toy and treat dispenser that includes a housing, a lid, an inner chamber with a plurality of vertical radial walls, a drum aperture, a motor assembly, and an external chamber. The plurality of containers hold non-liquid pet treats, and an opening on the drum aperture aligned vertically with the tangential walls allows the pet treat on a given container to be released into the external chamber and dispensed via timer or controlled wirelessly through a wireless remote or controlled by a mobile device like a smart phone or tablet through a wirelessly connected app interface.

12 Claims, 30 Drawing Sheets

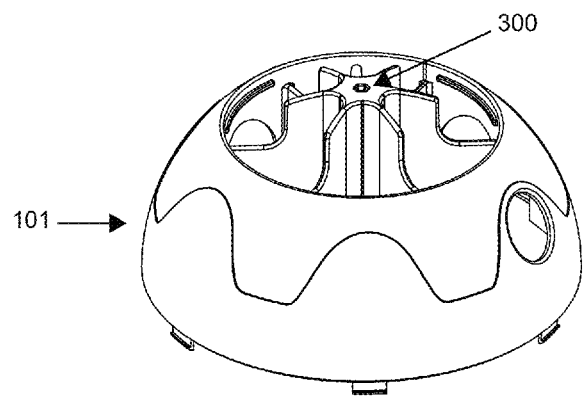
FIG. 7
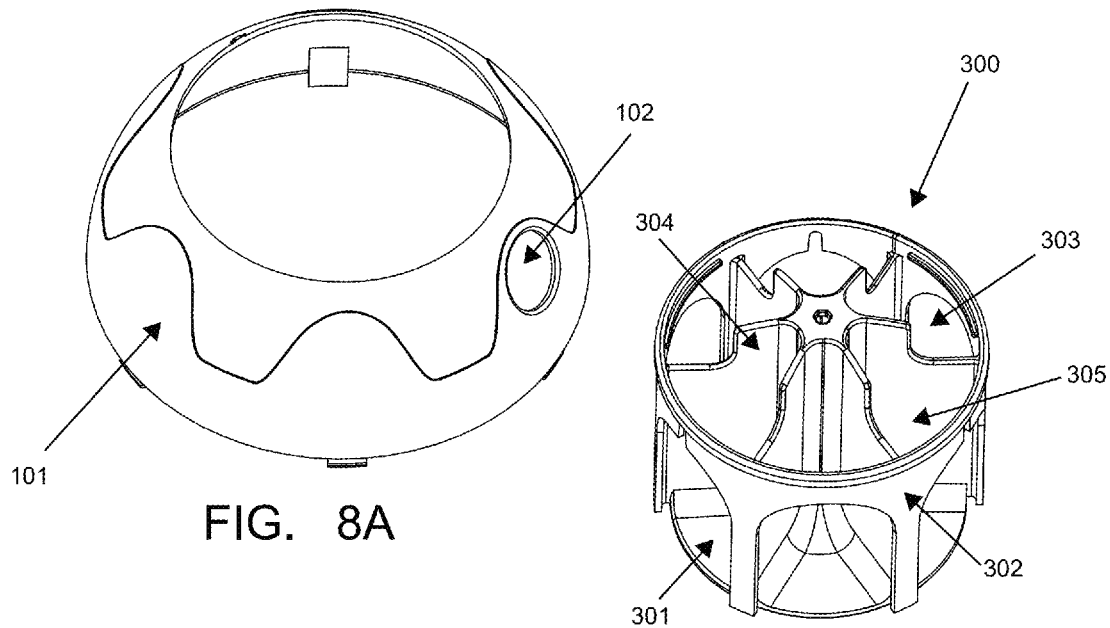
FIG. 8A
FIG. 8B

PUZZLE PET TOY AND TREAT DISPENSER

CROSS REFERENCE TO RELATED APPLICATIONS

This Application is a continuing-in-part Application of U.S. patent application Ser. No. 14/229,895, titled "Puzzle Pet Toy and Treat Dispenser," filed on Mar. 29, 2014, which claims priority date to a U.S. Provisional Patent Application 61/903,273 titled "Pet Toy and Treat Dispenser", filed on Nov. 12, 2013.

STATEMENT REGARDING FEDERALLY SPONSORED RESEARCH AND DEVELOPMENT

None.

FIELD OF THE INVENTION

The present invention relates to puzzle pet toys that dispense food or treats, and particularly, to a puzzle pet toy having a plurality of separate chambers that enables the dispensing of treats/food in a controlled way to thereby selectively dispense treats/food at an interval, such as scheduled, timed, and random.

BACKGROUND

Interactive pet toys are becoming increasingly popular. It is well known in the field that there are many benefits attributed to a pet toy that may stimulate an animal. As an example, the physical and mental health of a pet may be improved with interactive toys that cause a pet to be productively engaged with the toy.

Pet toys that dispense treats are commercially available in a myriad of configurations. By regulating the intensity and length of time an animal is occupied, the animal may be less prone to engage in negative behaviors. For example, a pet toy that dispenses treats while the owner is away is likely to pacify the pet from foraging food and engage in a destructive behavior in its living space.

While treat dispensing pet toys are generally known, many shortcomings of the prior art are not yet addressed in the field. One issue is the inability to sanitize the inner parts of the toy because of the construction of the toy. Other disadvantages with the prior art exist, for example the toy cannot regulate the rate of the treat being dispensed relative to the pet's attention. For an example, a hungry pet may be aggressively seeking every piece of the treat contained within the toy, while a disinterested pet may not even touch the toy without other motivations to do so. Because of these issues, pet toys from the prior art require a large degree of human supervision in order to be optimal and safe to use with pets.

Another issue that has not been addressed in the prior art is providing a motorized toy and treat dispenser present in the same device. In addition, pet toys involving motorized parts are notoriously difficult to clean unless the motor can be easily removed from the toy for cleaning. Therefore, most automatic feeders are stationary designs where the feeder dispenses food from a chamber to a pet bowl, and are not designed for the pets to interact with the feeder.

For the foregoing reasons, there is a need for a pet toy and treat dispenser that can entertain a pet for a period of time with minimal human supervision, and is relatively easy to clean and maintain.

SUMMARY OF THE INVENTION

The present invention is directed to a motorized puzzle pet toy and treat dispenser that enable a pet owner to automatically regulate the rate of dispensing of various types of treat/food from the device. The word "treat" used hereinafter is intended to include all animal foodstuffs that can be consumed by an animal to include traditional treats and food of widely varying types. Treats may take a number of different forms such as uniformly sized nuggets, or the treats can be irregularly sized and shaped.

The puzzle element of the preferred embodiment requires the pet to interact with the puzzle toy and treat dispenser in order for the toy to dispense the treat to the pet, unlike other pet food dispensers that dispense the treat without the need of the pet's interaction with the dispenser.

According to a preferred embodiment of a device of the present invention, the puzzle pet toy and treat dispenser has a housing, a lid, an internal chamber, an external chamber, removable drum aperture, and a removable motor assembly located at the base of the toy.

The internal chamber has a base, a perimeter wall perpendicular to the base having a cylindrical shape, and a plurality of divider walls that create a plurality of container spaces within the inner chamber. Each container's section of the perimeter wall has an opening that allows treat to be dispensed from said chamber. These containers can be loaded with treats by opening the lid and pouring treats into the separate chambers.

The drum aperture is shaped substantially like a cylinder, and envelops the perimeter walls and the base of the inner chamber. A receiver for a driveshaft is provided at the base of the drum aperture, removably connected to a motor assembly.

The external surface of the drum aperture and the internal surface of the housing form a cavity within the toy, here defined as the external chamber. The drum aperture has an opening in the size and shape of the opening of a perimeter wall of the container section of the internal chamber, such that it allows the treat to dispense from the container to the external chamber when the opening on the drum aperture and the opening of a container are aligned together. In this manner, only a portion of the treat in the inner chamber is dispensed to the external chamber at any given moment. As the drum aperture rotates to the next container, it opens the next container while enclosing the remainder of the containers.

In the preferred embodiment, the housing comprises of two separable pieces forming a substantially spherical toy, with each hemisphere having at least one opening to allow dispensing treats from the external chamber. The lower housing also has a receptacle that conforms to the shape of the removable motor assembly. The separable pieces of the housings allow the toy to be easily serviced by the pet owner, and in the preferred embodiment, all the parts of the toy are to be made of materials that are dishwasher safe.

The motor assembly has at least a motor connected to a drivetrain, which in turn is connected to a clutch that leads to a drive shaft. The drive shaft is then inserted into the receiver on the bottom of the drum aperture, which allows the motor to freely rotate the drum aperture. The motor assembly also contains a removable battery to power the motor, a switch to operate the motor, and a noisemaker that generates sound when the drum aperture moves to attract the animal to play with the toy.

During use, the pet must interact with the puzzle toy and treat dispenser in order for the toy to dispense the treats present in the external chamber. The low center of gravity due to having the motor assembly located at the bottom of the puzzle toy allows it to have a roly-poly toy effect, such that if a pet pushes over the toy with its paw or its face, it wobbles for a few moments while seeking the upright orientation of its natural equilibrium state. The puzzle toy will then dispense the treats through the openings on the external surface of the toy until it depletes all the in the external chamber.

In the preferred embodiment, the motor is located at the base of the toy, to act as a lower center of gravity for the toy. This results in a wobbling factor that allows the toy to move around and dispense treats during play, but also ensuring that the positions of the openings are perpendicular to the ground when the toy is standing still. Without this feature, it is very likely that the toy might be inverted or in a position where the chamber opening is not oriented in a way that allows treats to dispense from the inner chamber to the outer chamber.

The toy can also be equipped with wireless features that allow it to be controlled through a wireless remote, or through a smartphone or tablet. The toy can connect directly to the smartphone or tablet through a wireless connection such as the Bluetooth standard, or any other wireless connection protocol that is known in the art.

BRIEF DESCRIPTION OF DRAWINGS

These and other features, aspects, and advantages of the present invention will become better understood with regard to the following descriptions, appended claims and accompanying drawings where:

FIG. 07 shows an alternate view of the upper housing attached to the internal chamber;

FIGS. 08A and 08B show the inner chamber as a separate piece from the upper housing;

REFERENCE NUMBER INDEX

Figure 1:
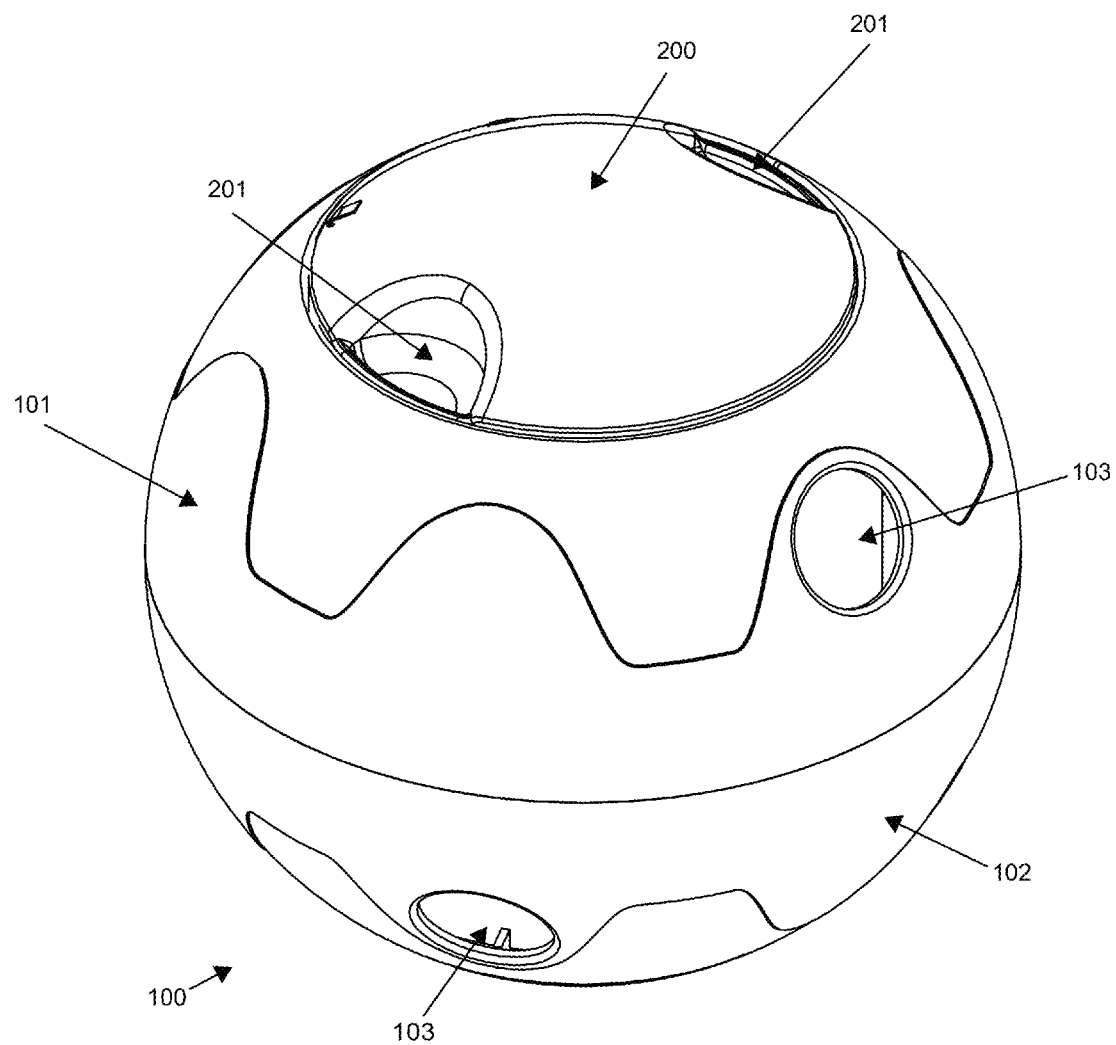
FIG. 01 shows a perspective view of the toy.
Figure 2:
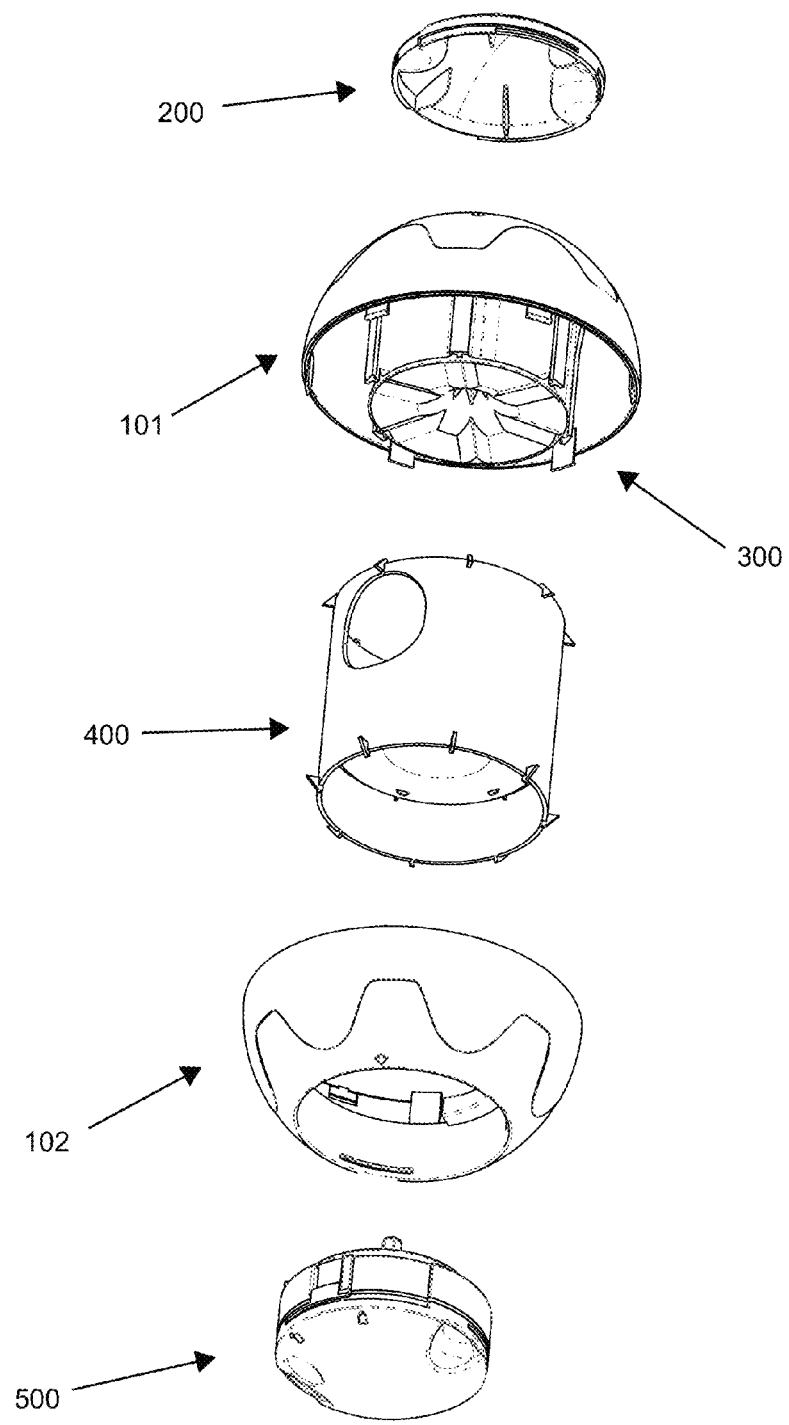
FIG. 02 shows an exploded view of the toy with all the removable parts.
Figure 3A:
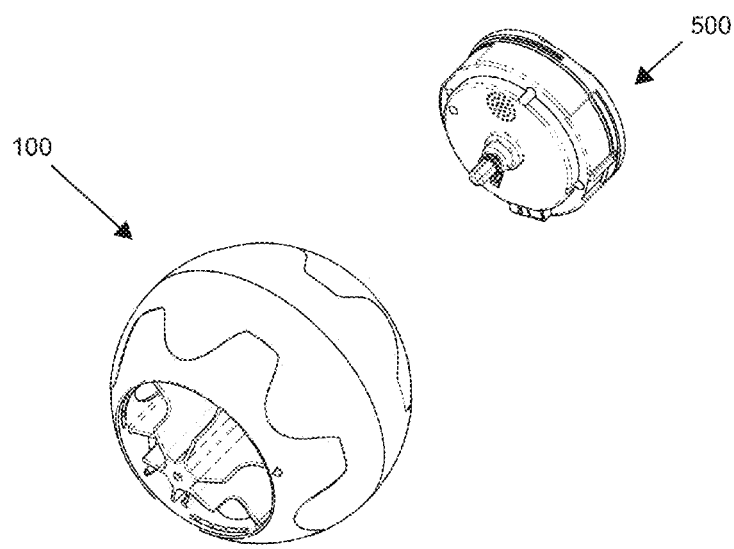
FIGS. 03A and 03B show a semi-exploded view of the toy assembled with the lid and motor assembly removed.
Figure 3B:
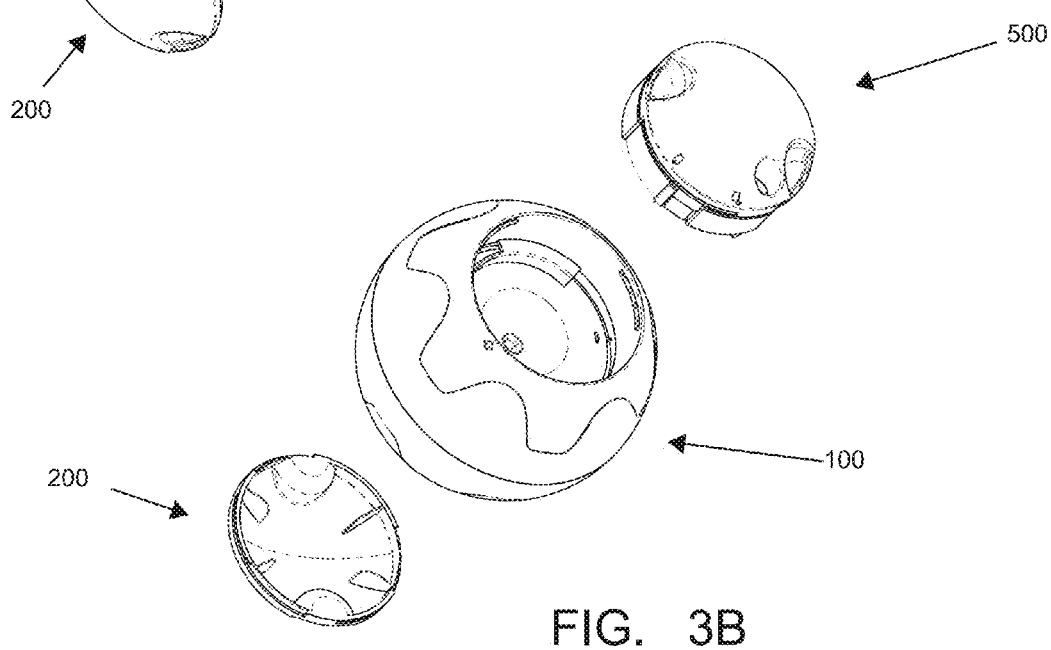
Figure 4A:
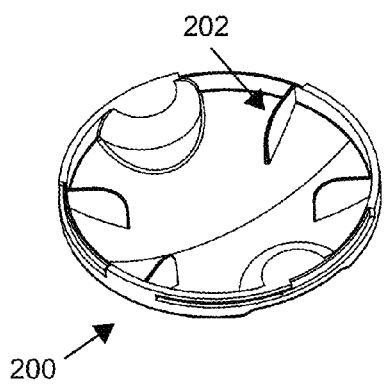
FIGS. 04A and 04B show the toy assembled and the inner surface of the lid.
Figure 4B:
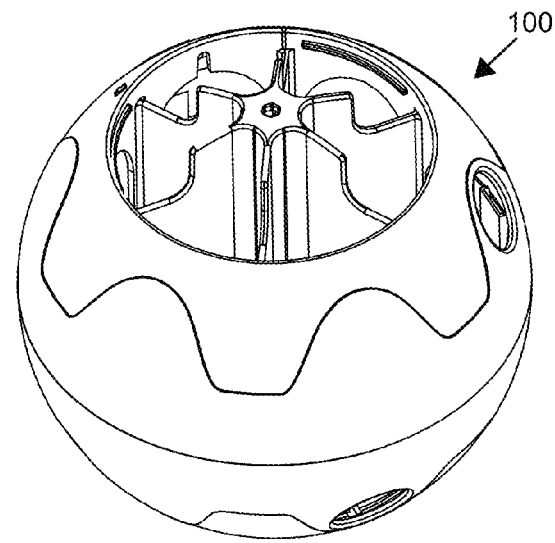
Figure 5:
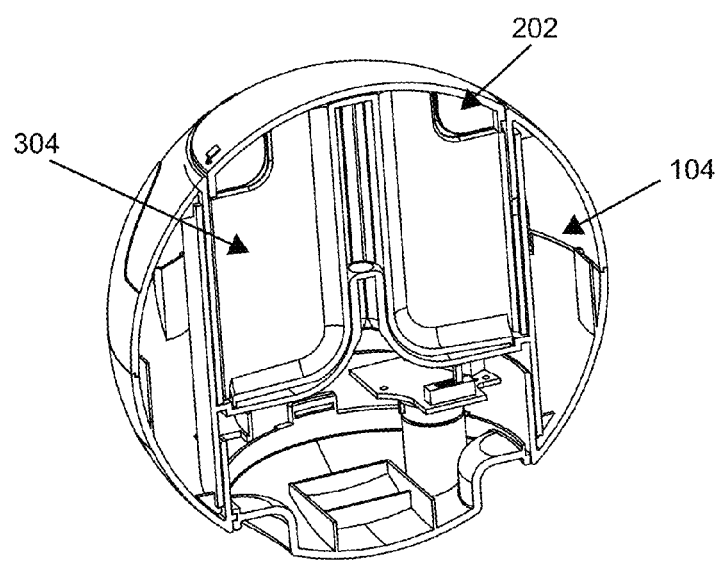
FIG. 05 shows a cross section view of the toy, showing the lid aligned with the dividing walls forming a container within the inner chamber, as well as the external chamber formed by the external surface of the drum aperture and the internal surface of the housing.
Figure 6:
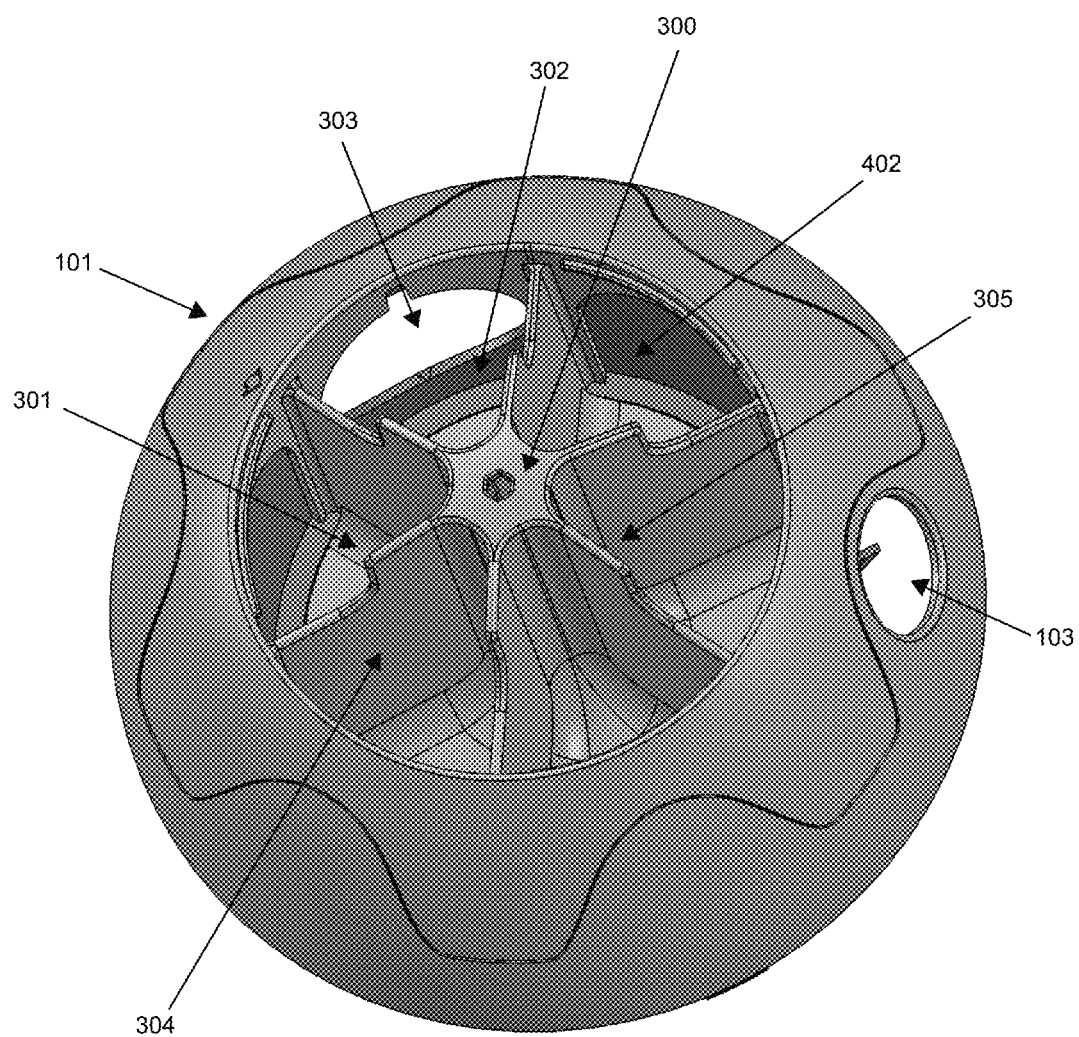
FIG. 06 shows a top perspective view of the toy with a section of the drum aperture enveloping the inner chamber, with the opening of the drum aperture aligned with one of the openings of the container in the inner chamber.
Figure 9:
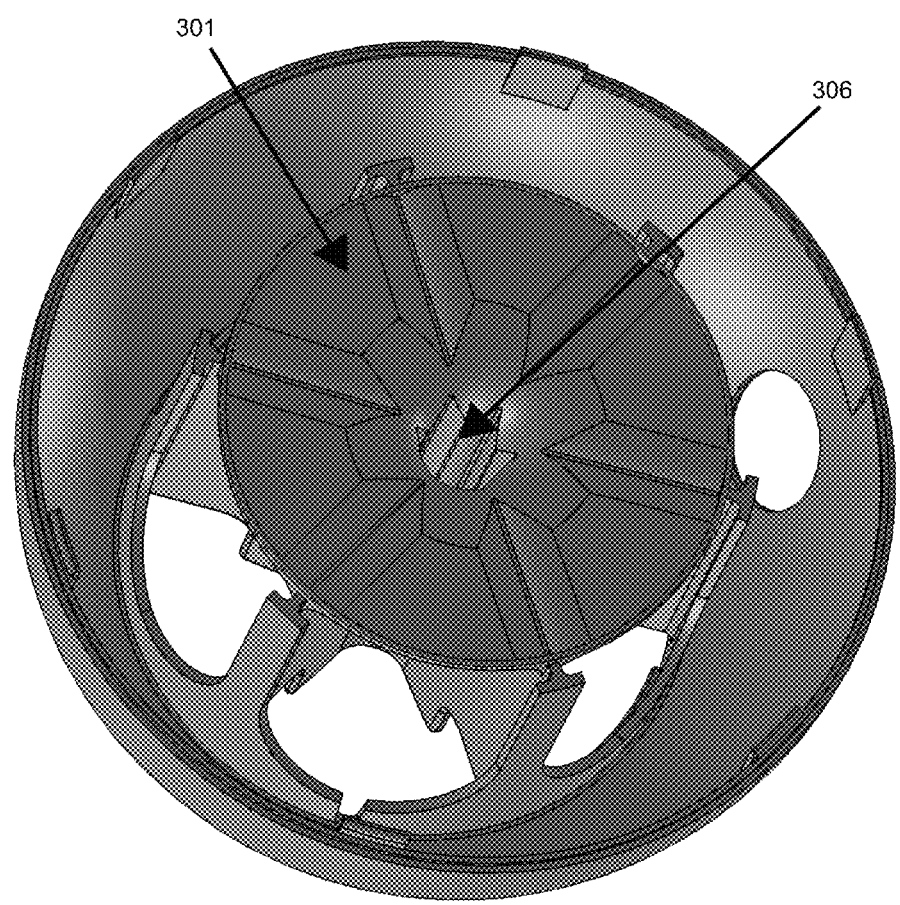
FIG. 09 shows the bottom view of the inner chamber showing the inner chamber base opening to receive the driveshaft socket from the drum aperture.
Figure 10:
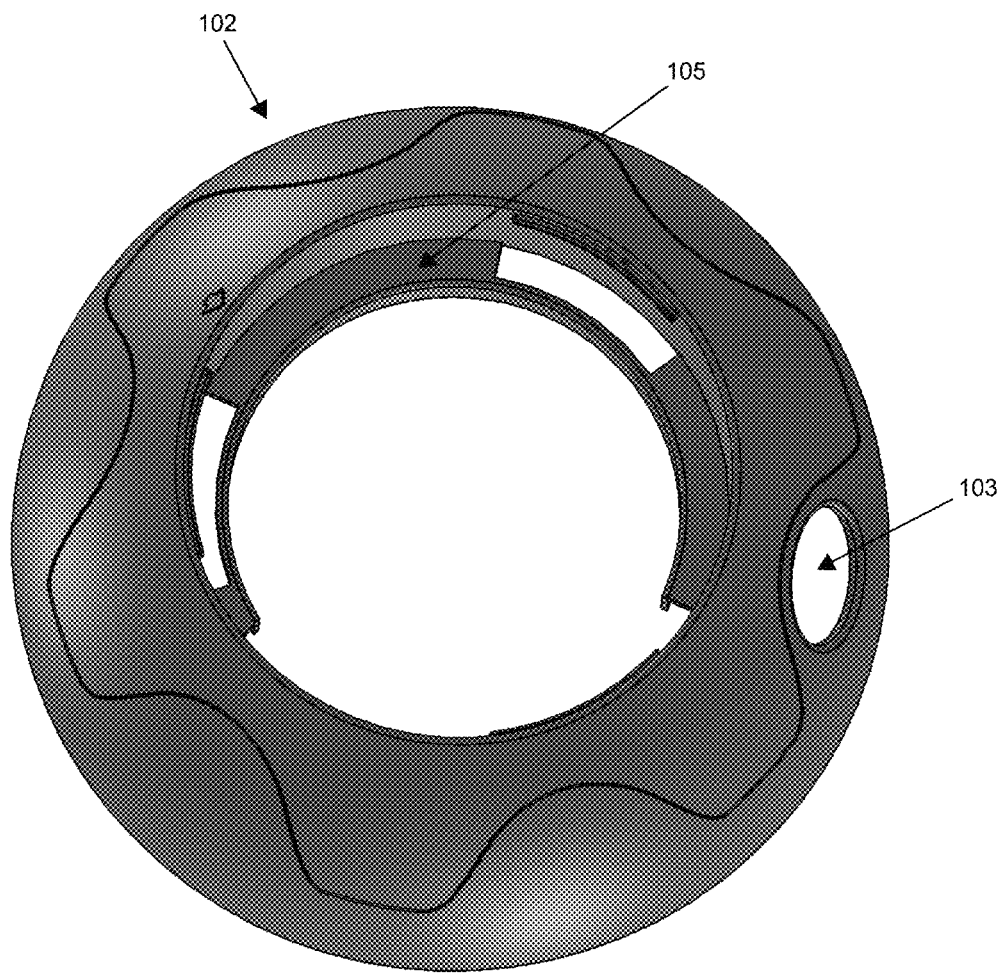
FIG. 10 shows the lower housing assembly with a receptacle to hold the motor assembly within the housing assembly.
Figure 11A:
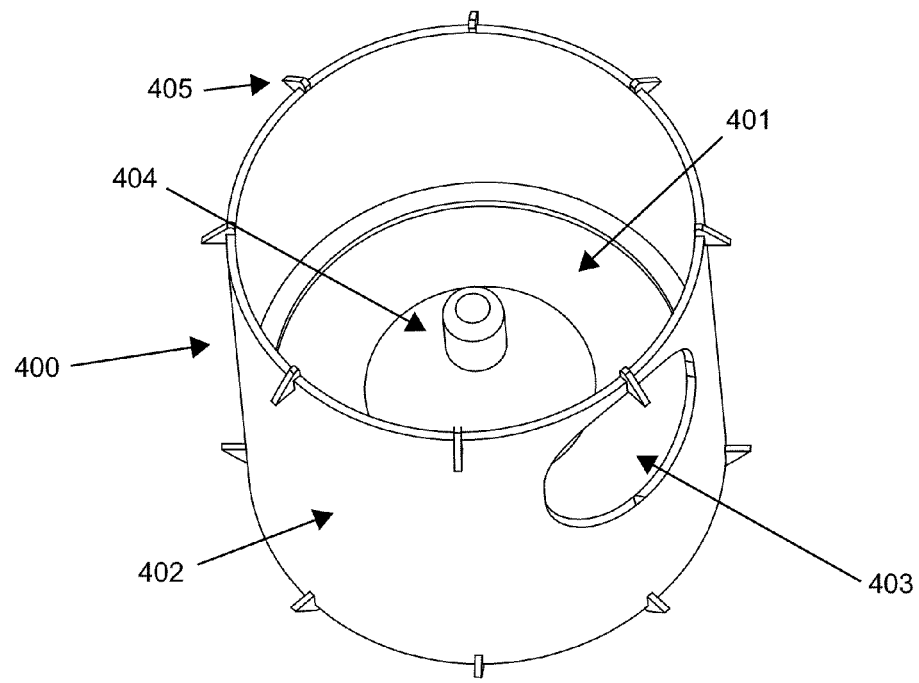
FIG. 11A shows a top perspective view of the drum aperture.
Figure 11B:
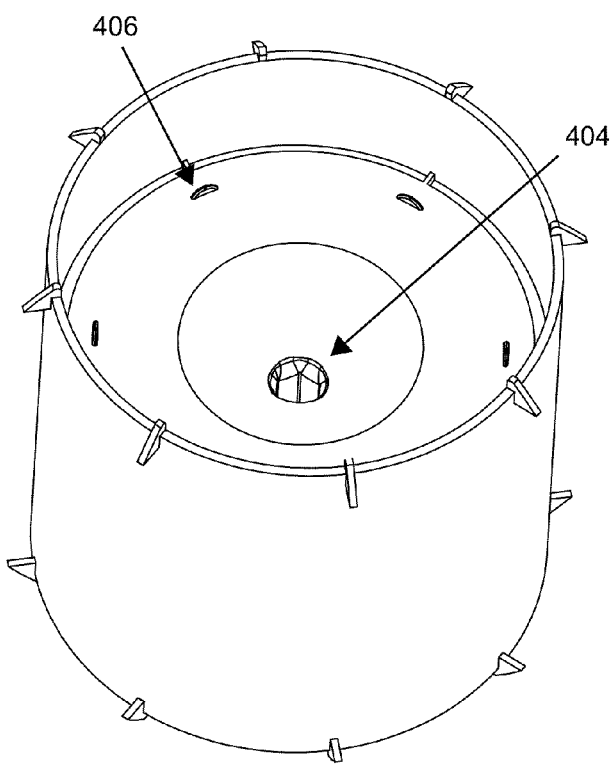
FIG. 11B shows a bottom perspective view of the drum aperture.
Figure 12A:
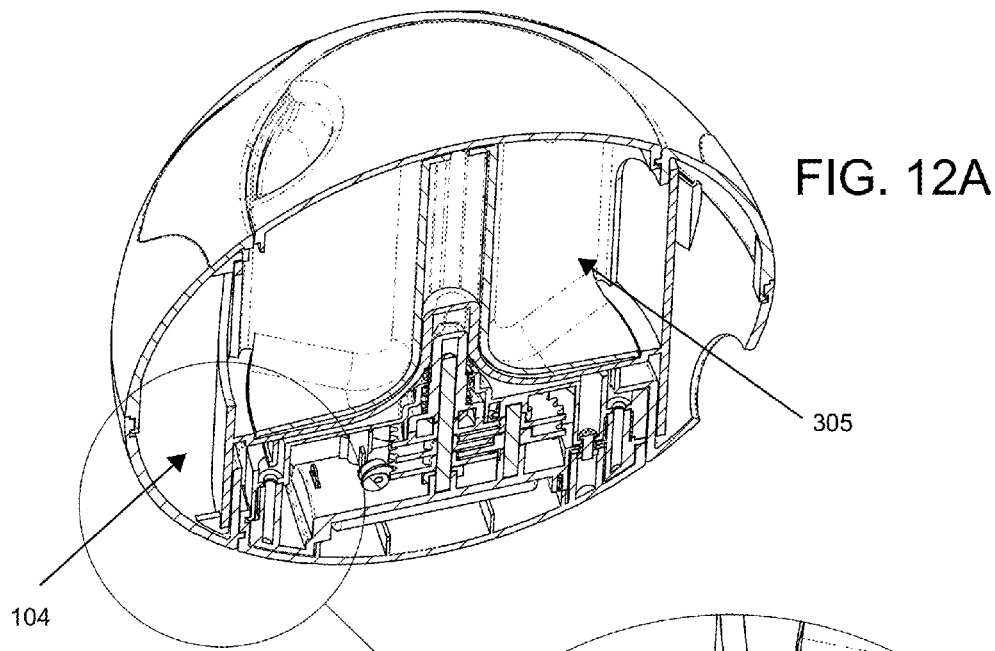
FIGS. 12A and 12B show a close up view of the drum aperture showing the scooping fins.
Figure 12B:
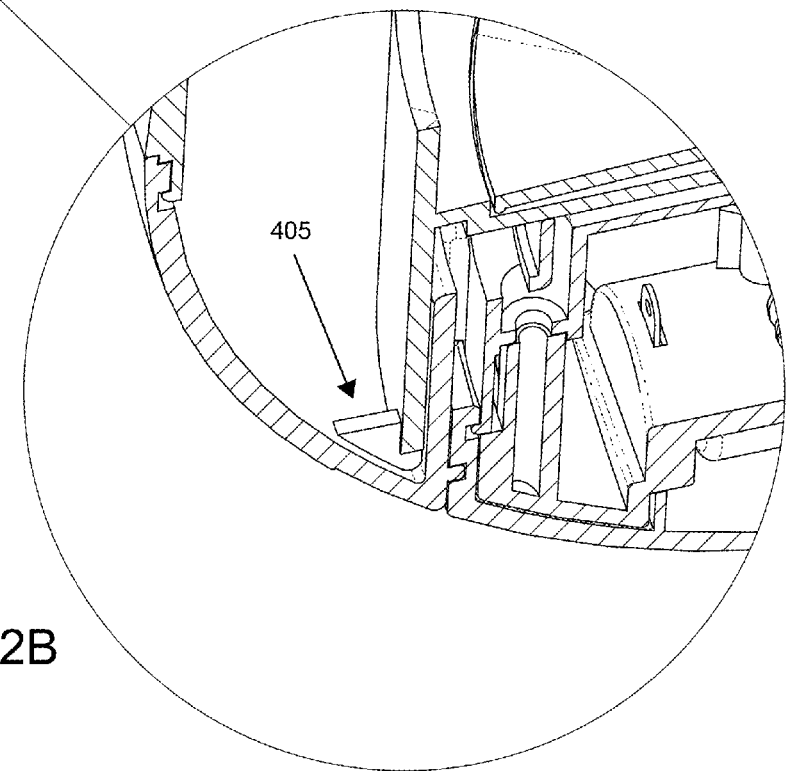
Figure 13A:
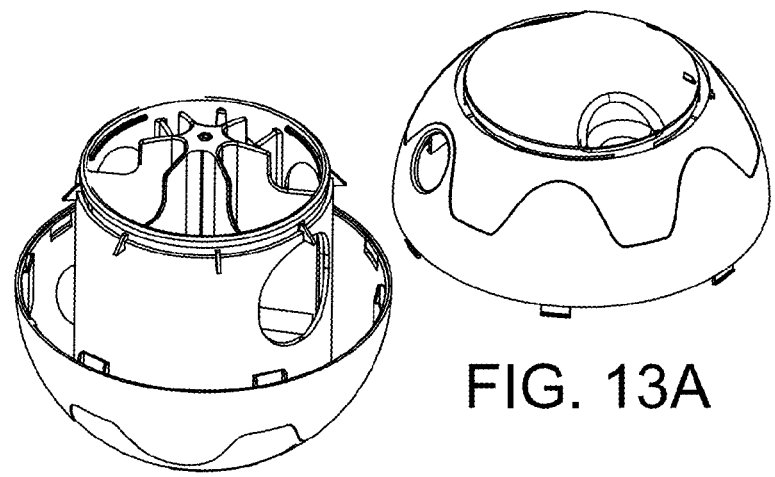
FIGS. 13A, 13B, and 13C show a stop animation view of the drum aperture rotating its opening from one container to the next.
Figure 13B:
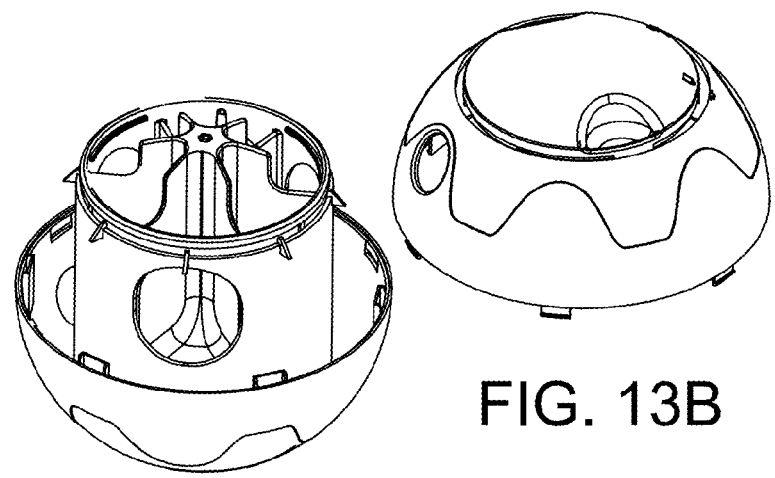
Figure 13C:
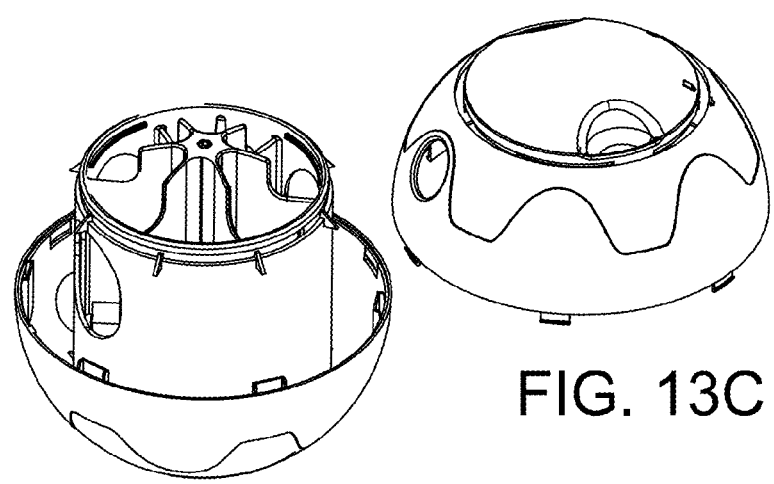
Figure 14A:
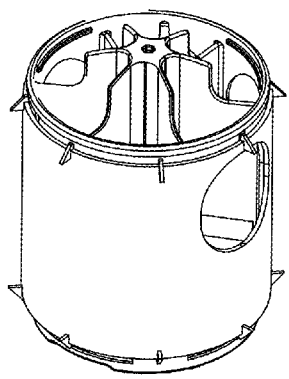
FIGS. 14A, 14B, and 14C show an alternate stop animation view of the drum aperture rotating its opening from one container to the next.
Figure 14B:
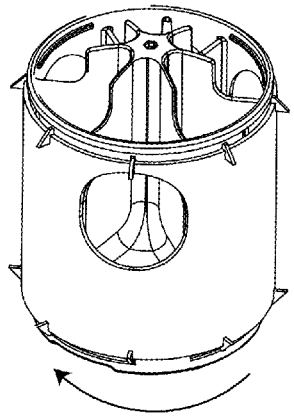
Figure 14C:
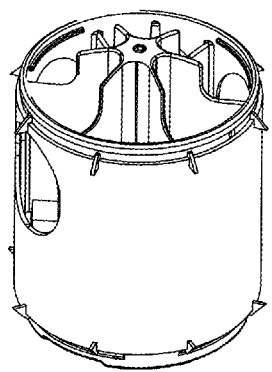

100 Puzzle Pet Toy and Treat Dispenser
101 Upper Housing
102 Lower Housing
103 Housing Opening
104 External Chamber
105 Motor Assembly Receiver
200 Lid
201 Recessed Finger Grips
202 Lid dividers
300 Inner Chamber
301 Inner Chamber Base
302 Inner Chamber Perimeter Wall
303 Inner Chamber Perimeter Wall Opening
304 Inner Chamber Divider Walls
305 Inner Chamber Containers
306 Inner Chamber Base Opening
400 Drum Aperture
401 Drum Aperture Base 402 Drum Aperture Perimeter Wall
403 Drum Aperture Opening
404 Driveshaft Socket
405 Scooping Fins
406 Trigger Actuators
500 Motor Assembly
501 Battery
502 Battery Cover
503 Motor
504 Gears
505 Clutch
506 Striker
507 Noisemaker
508 Driveshaft
509 Stop Switch
510 Interval Selector
511 Power Button
512 LED
513 Recessed Finger Grips
514 Speaker Grill
515 PCB Circuit
600 Pet
700 PCB Logic Flowchart
701 Set time interval step
702 Power up step
703 Chamber Rotation step
704 Conditional check step
705 Reset time interval step
706 Shut down motor and power step
800 User Process Flowchart
801 Open lid step
802 Load container with treats step
803 Close lid step
804 Remove motor assembly step
805 Set timer step
806 Replace motor assembly step
807 Power on step
808 Rotate drum aperture step
809 Repeat process step
810 Wait for interval step
811 Shut down power step
900 Training Process Mode
2001 nrf51822 Circuit Board/Chip
2010 internal flash
2011 BlueTooth 4.0 Stack
2012 Application Code
2020 Internal Ram
2021 2.4 GHz Radio
2022 SPI
2023 12C
2024 GPIO
2030 Antenna
2040 External Flash
2041 usage data
2042 settings
2043 audio data
2050 accelerometer
2060 Motor
2070 LEDs and Buttons
2080 Amplifier
2081 Speaker
2300 Mode
2300 Application start/Flow of App
2301 Launch Background Process
2302 State/us indicator
2303 Activity: Change Settings
2304 Activity Indicator (paring)
2305 PAIRED indicator
2306 Prior Pairing Status
2307 Prior Devices present?
2308 PAIRED indicator
2309 UnPaired indicator
2310 PAIRED status, of PAIRED
2311 Firmware check
2312 Update firmware if necessary
2313 Status indicator: PAIRED
2314 Activity: Change Settings
2315 Activity: View Usage
2316 Activity: Change Schedule
2317 Activity: Unpair
2318 Status: Unpaired indicator
2350 Flow of App
2351 REPEAT Process A
2352 Status: Paired?
2353 Activity: Update Device Time
2354 System Check: Schedule Change
2355 Activity: Update Schedule for Device
2356 Status: Data, Update
2357 Activity: Collect & Update Usage Data
2358 Status: Sleep Mode
2359 REPEAT Process A
2400 APP FLOW
2401 Device Start up
2402 Initialize
2403 REPEAT Process A
2404 System Check: Firmware?
2405 Activity: Update firmware
2406 System Check: Time?
2407 Activity: Update Time?
2408 System Check: New Schedule?
2409 Activity: Update Schedule
2410 System Check: New Tune/sound
2411 Activity: Update new tune/sound
2412 System Check: Time to dispense?
2413 Activity: Dispense
2414 REPEAT Process A
2500 APP interface
2501 Status: Connectivity (Connected/Disconnected)
2502 Device Name
2503 Pairing Status
2504 Start radio button
2505 Radio button—for setting duration of activity
2506 Radio Button—For ring tone or sound
2507 Radio Button—HOME
2508 Radio Button—Settings
2509 Radio Button—Usage
2510 Settings—specified time interval
2511 Settings—scheduled time
2512 Settings—random time(s)
2600 APP interface
2601 Status of Connected or nearby/far from Device(s)
2602 Status of Connected or nearby/far from Device(s)
2700 APP interface
2702 Named Device
2800 APP interface
2811 Time of Day—10:00.00 AM
2812 Time of Day—11:00.00 AM
2813 Time of Day—11:45.00 AM
2814 Time of Day—2:00.00 PM
2900 APP Interface
2917 Interval Time (Minimum)
2918 Interval Time (Maximum)
3000 APP interface
3010 Settings 3011 THIS DEVICE (Device Name)
3012 Radio Button—For renaming device
3013 Radio Button—identify this device
3020 Settings—Background Image
3021 Background images choices radio button
3022 Settings BackGround
3023 Settings—Radio Button on and off
3024 Settings—Select Background
3025 Settings—Take a picture
3026 Settings—Use Default Background
3100 Settings (Continued)
3110 Settings—Sounds
3111 Settings—Bell
3112 Settings—Select Sound
3113 Settings—Radio Button on/off
3120 Settings—Copyright and Acknowledgements (and other legal information)
3121 Settings—Multiple languages of Copyright and Acknowledgements
3122 Settings—Feedback/Report an issue or problem
3200 APP Interface
3210 Toggle: THIS DEVICE
3220 Toggle: ALL DEVICES
3211 Clear (devices)
3230 Email (regarding devices/interaction of devices)
3240 Activity of Device
3250 Radio Button/Toggle on/off/activity
3250 Radio Button/Toggle On/off/Dispense

DETAILED DESCRIPTION OF THE PREFERRED EMBODIMENT

FIG. 1 shows the look and feel of the preferred embodiment of the invention. The preferred embodiment comprises a housing 100, a lid 200, an inner chamber 300, a drum aperture 400, and a motor assembly 500.

The housing 100 has a substantially spherical shape to allow the toy to roll around freely during play. Also in the preferred embodiment, the housing 100 can be formed from two pieces combined into one housing, with the pieces here described as an upper housing 101 and a lower housing 102. The housing should have a plurality of openings 103 to allow treats to dispense from the external chamber 104 within the housing, the external chamber formed by the internal surface of the housing 100 and the external surface of the drum aperture 400. The lower housing 102 has a receptacle that can retain and hold the motor assembly 500 by using a twist-lock method of securing the motor assembly within the lower housing body.

The inner chamber 300 comprises of a base 301, a perimeter wall 302 perpendicular to the base, and a plurality of divider walls 304 that divide the inner chamber into a plurality of containers 305. The divider walls 304 divide the perimeter wall 302 into equal sections, with each section creating an individual treat container 305. On each of the perimeter wall section 302 of a given container has an opening 303 that allows treats to travel from an open container 305 to the external chamber 104. Located on the external surface of the base of the inner chamber 301 is an opening 306 to receive the driveshaft socket 404 of the drum aperture 400. It should be noted that the internal surface of the opening on inner chamber base 306 does not come to contact with the external surface of the driveshaft socket 404 at any point, only to provide space for the socket during assembly.

Figure 15A:
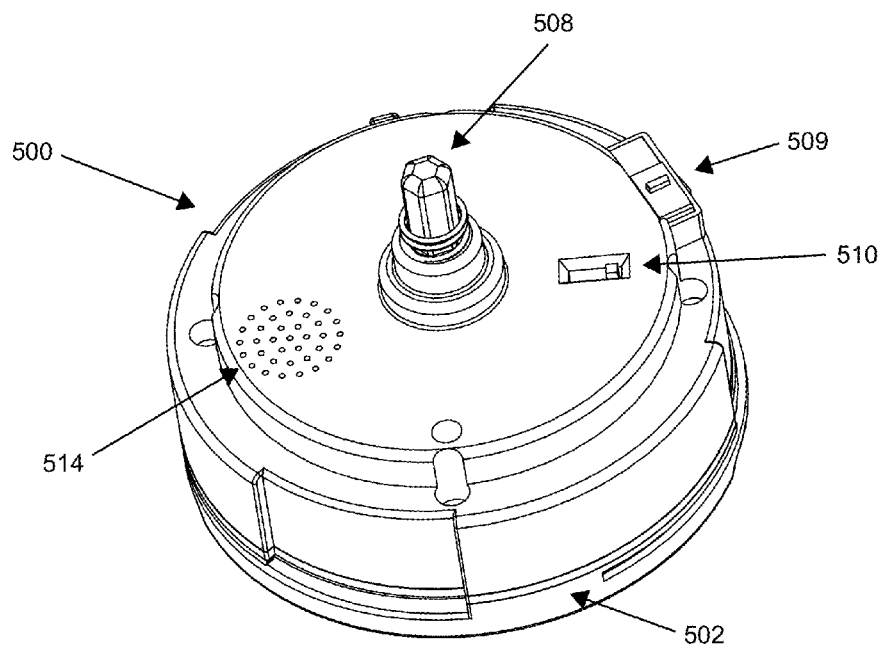
FIG. 15A shows a perspective view of the inner side of the motor assembly.
Figure 15B:
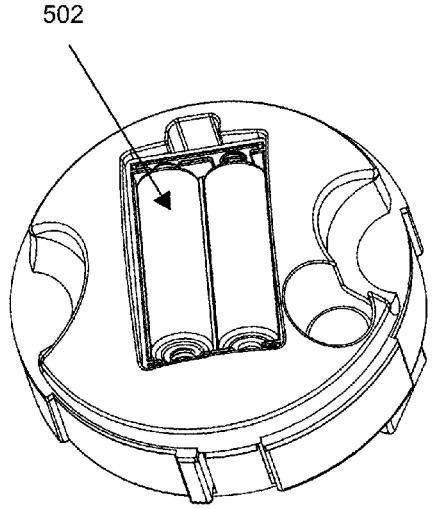
FIG. 15B shows a perspective view of the outer side of the motor assembly without the battery cover.
Figure 15C:
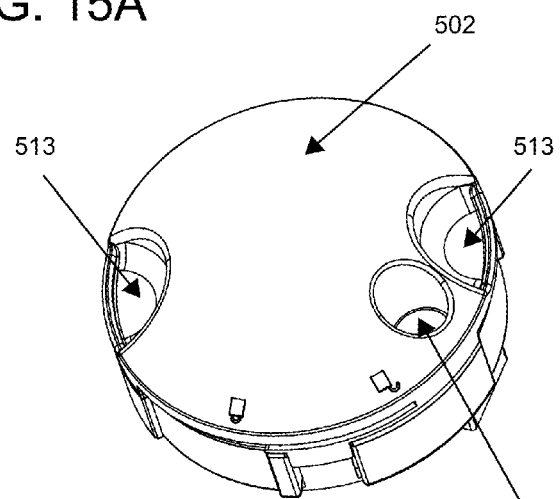
FIG. 15C shows a perspective view of the outer side of the motor assembly with the battery cover.
Figure 16:
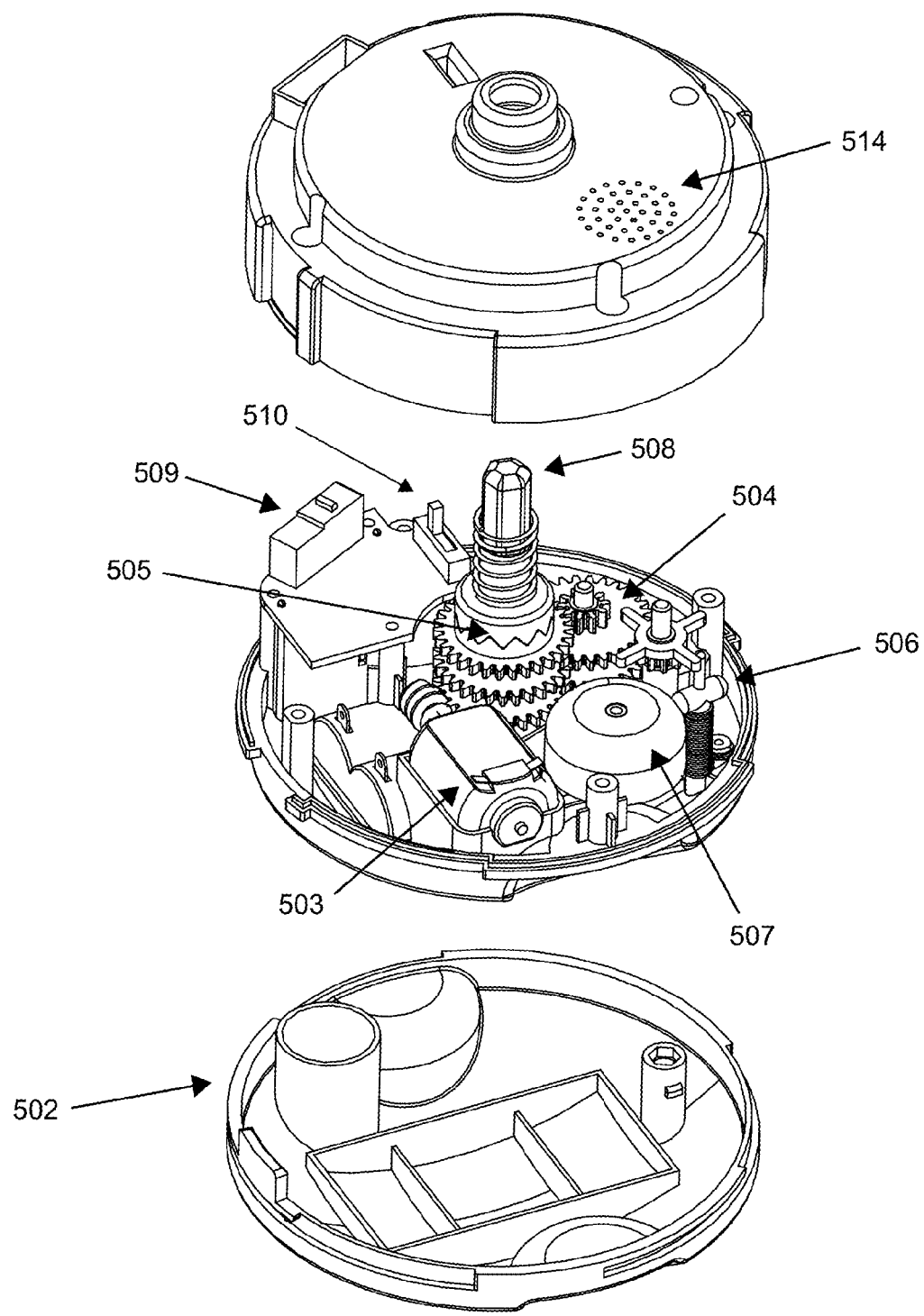
FIG. 16 shows an exploded view of the motor assembly.
Figure 17A:
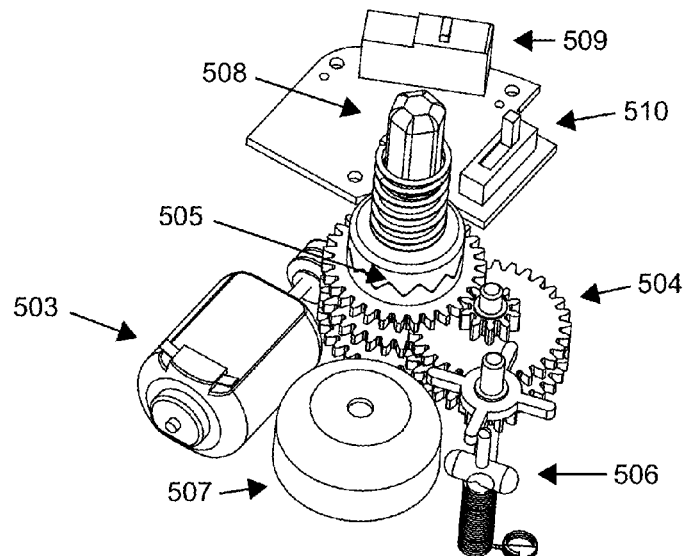
FIGS. 17A, 17B, and 17C show the internal views of the motor assembly.
Figure 17B:
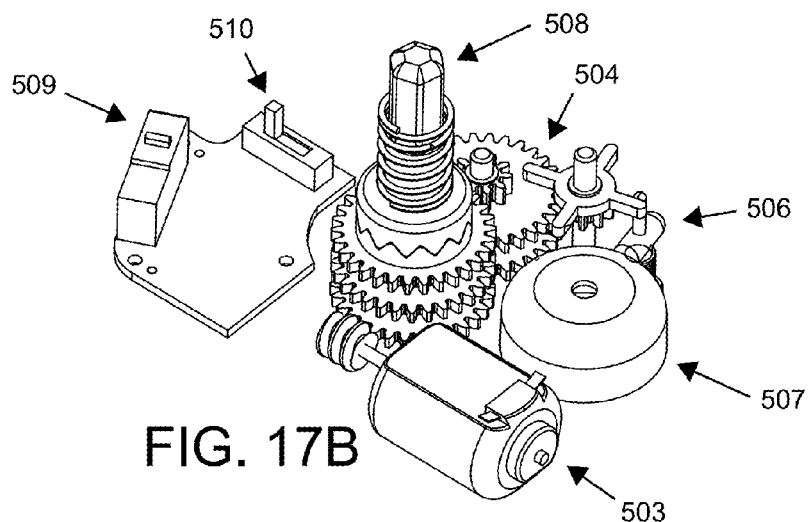
Figure 17C:
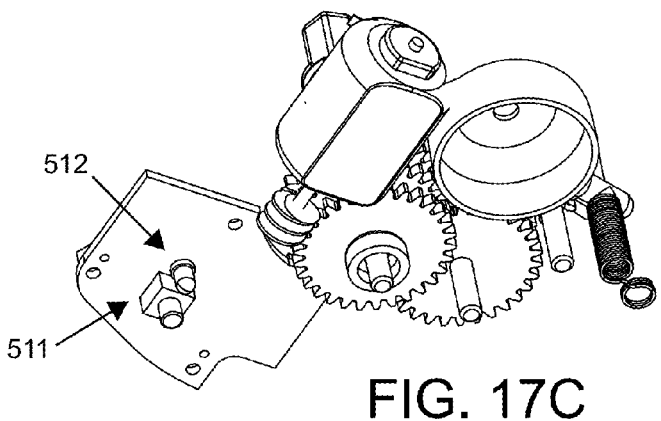
Figure 18A:
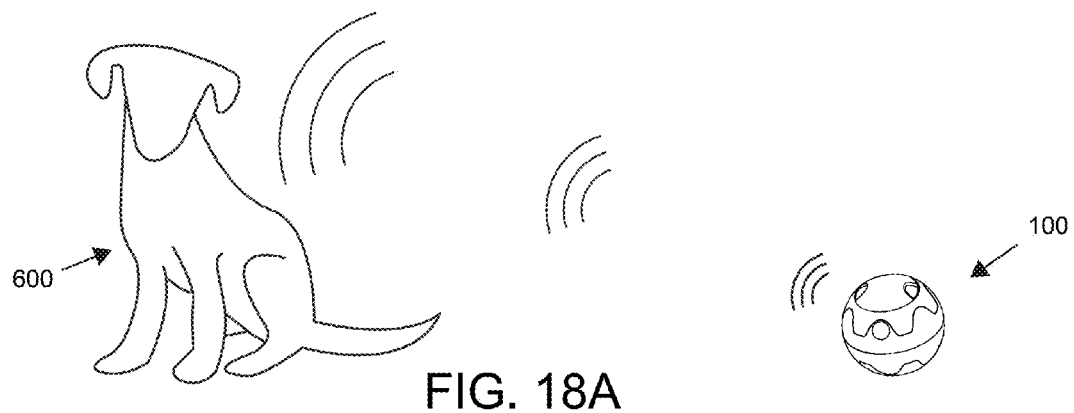
FIGS. 18A, 18B, and 18C show a step diagram of a dog interacting with the toy.
Figure 18B:
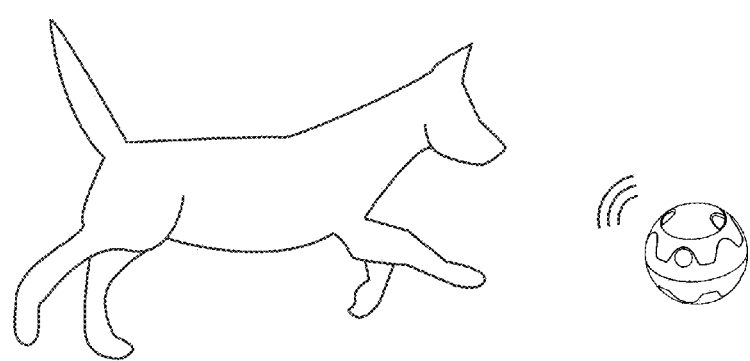
Figure 18C:
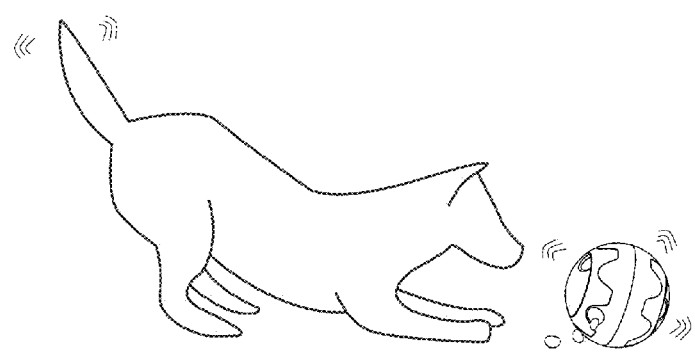

The lid 200 is located at the top of the housing, and in the preferred embodiment is secured using a twist-lock method. A plurality of recessed finger grips 201 are present to assist users in tightening or opening the lid. The inner surface of the lid has a plurality of dividers 203 that aligns with the top portion of the plurality of the divider walls in the inner chamber, creating a complete enclosure of the individual containers 305 from the base 301 to the inner surface of the lid 200. The plurality of containers 305 are completely enclosed from one another such that the treats are separately contained within each container space; the only possible means of access to the individual container would be by opening the lid 200 or when the drum aperture opening 403 aligns completely with the inner chamber perimeter wall opening 303 of a given container. FIGS. 15a, 15b, and 15c along with FIGS. 16a, 16b, and 16c show the step by step operation of a container being opened and closed during the rotation of the drum aperture 400.

The drum aperture 400 has a preferably circular base 401, and a perimeter wall 402 perpendicular to the base forming a substantially a cylindrical shape. Located at the center of the external surface base is a socket 404 for the driveshaft 507 that connects the motor assembly 500 to the drum aperture 400. The base 401 is slightly recessed inside the perimeter wall 402 to accommodate the depth of the motor assembly 500 being inserted into the lower housing 102 and the drum aperture 400. In the preferred embodiment, the socket 404 is shaped in a way that conforms with the driveshaft 507 such that the driveshaft firmly holds to the socket and does not slip when rotating the drum aperture 400. A symmetrical shape such as a hexagon or an octagon is preferred because it allows multiple ways of the drive fitting into the socket when the motor assembly is replaced into the toy. An opening in the perimeter wall of the aperture 403 is provided to allow treats to travel from the separate containers 305 to the external chamber 104. The size and shape of the opening 403 should conform substantially to the inner chamber perimeter wall openings 303 of the individual containers to maximize the number of treats dispensed when a container 305 is opened by the drum aperture 400.

A plurality of scooping fins 405 can be provided in the upper and lower edges of the perimeter wall 402 that conforms to the shape of the internal surface of the housing 100 as an alternate embodiment of the present invention. The scooping fins 405 prevent any treats that may inadvertently jam on the corners and prevent the drum aperture 400 moving freely during operation. At the perimeter of the external surface of the drum aperture base 401, a plurality of correspondingly spaced trigger actuators 406 around the perimeter of the base are provided to interact with the stop switch 508 on the motor assembly 500 and regulate the operation of the motor 502.

The motor assembly 500 comprises a housing for the battery 501 powering the motor, a battery cover 502, a motor 503 connected to a plurality of gears 504, said plurality of gears having connected to a clutch 505 and a striker 506 capable of striking a mechanical bell 507. The clutch is then connected to driveshaft 508 that can be inserted into a driveshaft socket 404 located on the base of the drum aperture 401. It should be clear to a person having ordinary skill in the art that the striker and mechanical bell portion can be substituted as any noise-making device that is synchronized to the rotating motion of the drive shaft. Present within the motor assembly is a stop switch 509 that is activated by a plurality of actuators located at the perimeter of the external surface of the drum aperture base. Whenever the stop switch 509 is pressed by the actuator, it stops the motor from moving the drum aperture around the internal chamber. The stop switch 509 is located on the inner side of the motor assembly facing the external surface of the drum aperture base. An interval selector 510 is provided on the inner side of the motor assembly that can be toggled by the user to set the time interval for the aperture opening moving to the next chamber. Having the stop switch 509 and the interval selector 510 located on the inner side of the motor assembly minimizes the possibility of a pet accidentally accessing these control functions. A power button 511 is provided on the outer side of the motor assembly. The power button 511 is recessed slightly so a pet cannot reach the button, but a human using his/her finger can. In the preferred embodiment, an LED indicator 512 is provided along with the power button to inform the user about the mode and the status of the motor. The power button 511 and LED indicator 512 sit on a Printed Circuit Board (PCB) assembly 515 that stores the software logic for the motor operation.

A speaker grill 514 is provided to allow sound to travel out from the noisemaker 507. A plurality of recessed finger grips 513 are provided on the outer side of the motor assembly to assist a person to comfortably grip the motor assembly during removal and replacement of the assembly. In the preferred embodiment, the motor assembly is located at the base of the toy and drum aperture and acts as a lower center of gravity for the toy. The contents of the motor assembly acts as a weight, and eliminates the need for a separate weight to achieve a lower center of gravity in an alternate version of the toy.

The noisemaker 507 creates a sound to attract the pet to interact with the puzzle toy. In the preferred embodiment, the sound produced by the noisemaker is timed to coincide with the rotation of the drum aperture 400 to signal the pet that there are treats ready to be dispensed from the toy. The noisemaker can be in the form of a traditional mechanical bell, as chosen in the preferred embodiment. However, it should be noted that the noisemaker can be in the form of a digital sound chip playing a prerecorded sound, music, or speech that indicates the action of a mechanical bell.

In the preferred embodiment, the housing, the lid, and the rotating aperture is made out of food grade plastics, such as HDPE, PE, LDPE, ABS, PET, and other suitable food grade plastic commonly used in the field for food containers. The food grade plastic is chosen for its inert, durable characteristics such that it is safe for the pet to consume treats dispensed from the puzzle toy, or any other materials that would have been available to a person skilled in the art. Finally, the pet owner can safely disassemble and wash the puzzle pet toy after use, and the parts made out of the food grade plastic is ideally made to be dishwasher safe.

FIGS. 21a, 21b and 21c show the method of play of the preferred embodiment. A pet owner leaves the pet 600 with the toy fully loaded with the treats, sets the time interval, and leaves the pet alone with the toy. As the motor rotates the drum aperture, a noisemaker in the assembly emits an audible sound to attract the pet's attention. As the pet approaches the toy and interacts with the toy, the toy wobbles around and dispenses treats from the external chamber. The pet then eats the treats dispensed from the toy, and usually will attempt to retrieve more treats by playing with the toy. In the usual scenario, the pet will usually lose interest as soon as it perceives all the treats that have been dispensed by the toy, and would leave the toy alone. The toy then counts down to the next scheduled time interval. Once the countdown is reached, the timer activates the motor, with the drum aperture moving to the next chamber and while doing so, activates the noisemaker that lasts for a few seconds as the drum aperture moves to the next container. The pet will gradually associate the noise with the toy dispensing treats, and will have enough motivation to play with the toy even when the owner is not around.

Figure 19:
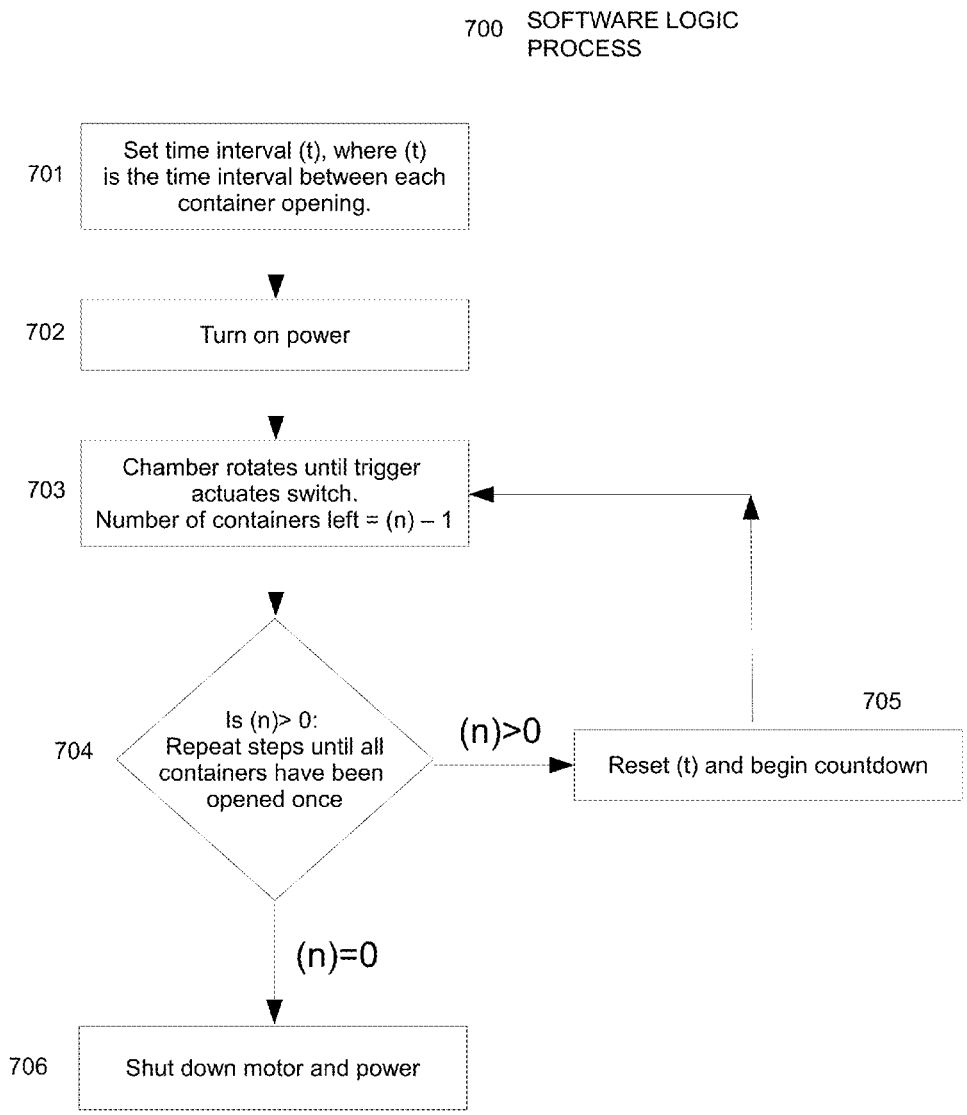
FIG. 19 shows a diagram flowchart of the software logic used in the toy.
Figure 20:
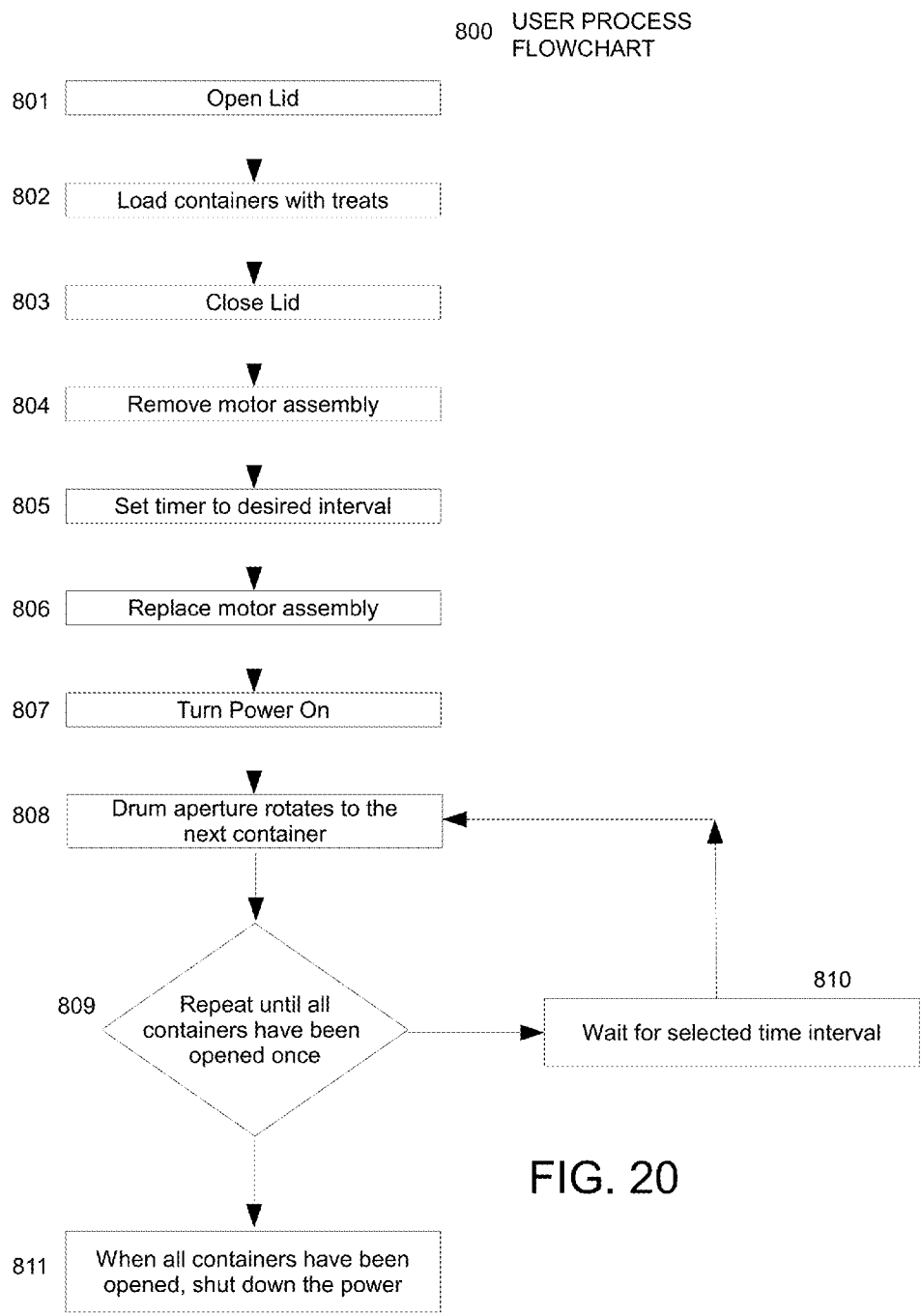
FIG. 20 shows a step-by-step use of the toy by the owner.
Figure 21:
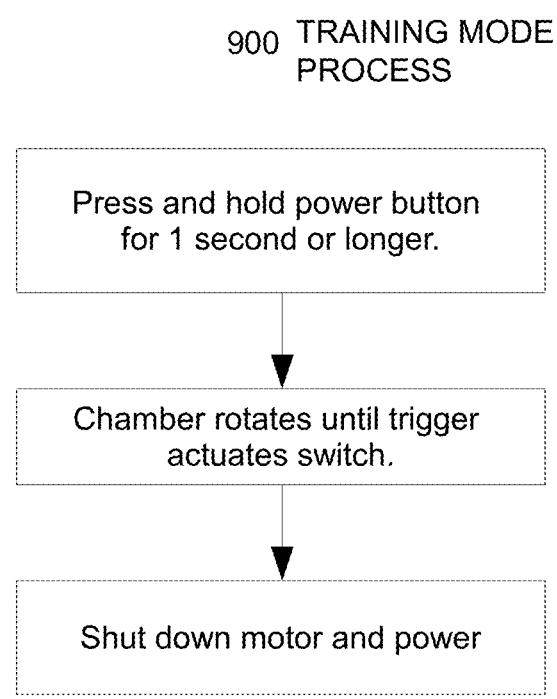
FIG. 21 shows a diagram flowchart of a training mode feature in the preferred embodiment.
Figure 22:
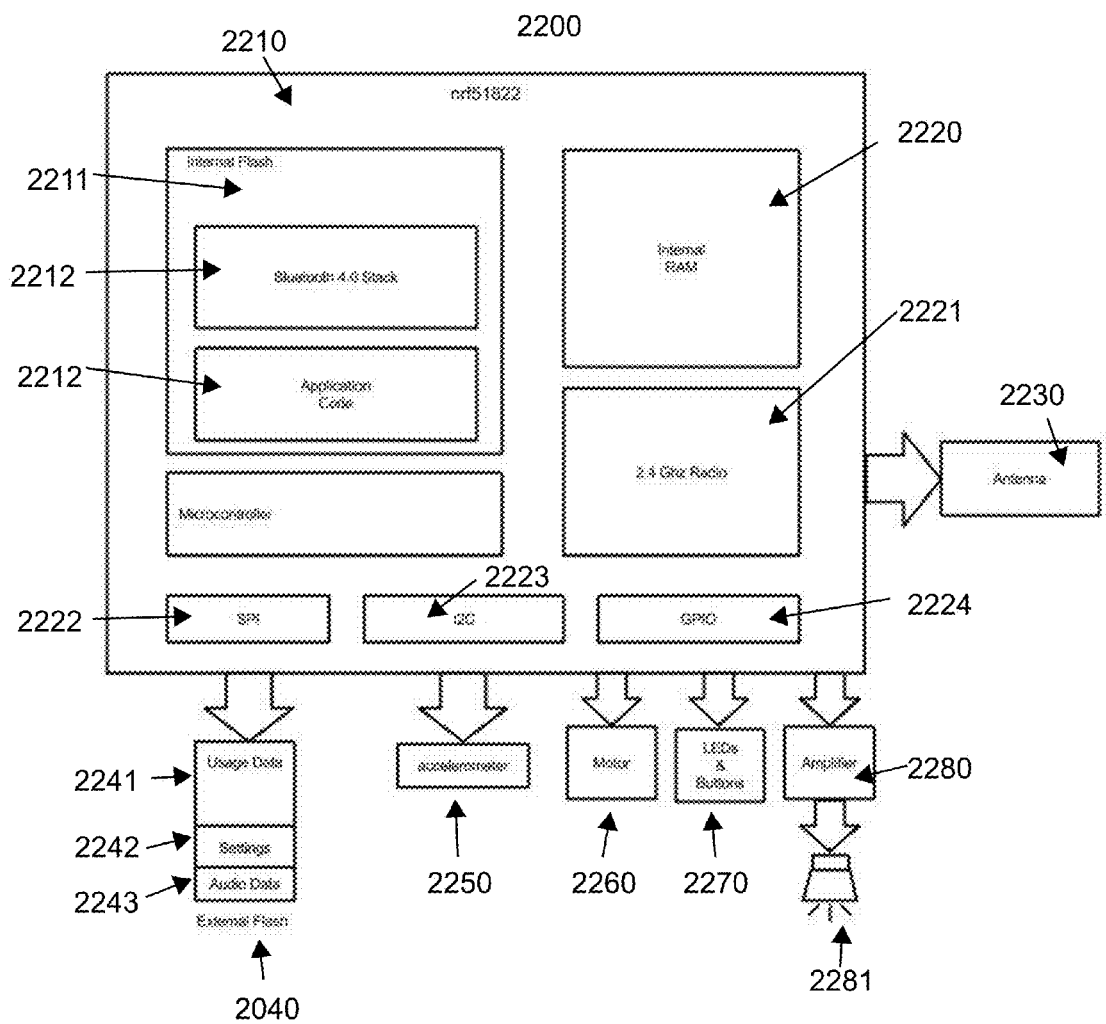
FIG. 22 shows a block diagram of a training mode feature in the preferred embodiment.

In the preferred embodiment, the toy can have several modes of use. One such mode is the general use, where the user opens the lid 801, loads the treat into the containers 802, close the lid 803, remove the motor assembly from the toy 804, set a time interval 805, replace the motor assembly 806, activate the toy by turning the power on 807, and as the toy is powered on the drum aperture rotates to the next container 809, and finally leaving the toy for the pet to play with. FIG. 22 shows a flowchart of the software logic used in the preferred embodiment to regulate the interval between opening the next container. The time interval can be set in increments of 15 minutes between the rotation to the next chamber (15 minutes, 30 minutes, 45 minutes, and 1 hour), or other time intervals desirable for the toy. Another mode available to the user is the training or demo function, where the drum aperture rotates only once to dispense the treats on the next available chamber. FIGS. 19, 20, and 21 show a flowchart of this mode. The purpose of this function is to train a pet to associate the sound and movements made by the toy with the dispensing of the treat, so the pet understands what the sound means when left alone with the toy. The second mode is desirable in scenarios where the pet has an aversion to the toy, or does not comprehend the function of the toy such that the owner needs to train the pet to understand the purpose of the toy.

In the training mode, a user simply presses and holds the power button 900 for at least one second or longer. When this is done, the chamber rotates until the trigger actuates switch, and this action shuts down the motor and power. The user can repeat this action indefinitely with the pet, so the pet can associate the noise generated by the toy to signal play and feeding time. It should be noted that the mechanical action of activating the training mode is for illustration purposes, and a person having skilled in the art can create an analogous function with a variation of the process, and these variations are meant to be covered under this disclosure.

FIG. 22 shows a block diagram of a possible embodiment of a chipset that allows the toy to wirelessly connect and be controlled through a smartphone or wireless remote. It should be noted that all the components displayed in the diagram are for illustrational purposes only, and not meant to be a limitation to the claims. The chipset 2200 comprises of an internal flash memory 2211, which stores the Bluetooth Stack 2212 and Application Code 2213. The chipset also has an internal RAM 2220, and a wireless radio 2221 to receive and broadcast signals to and from the chipset, and said radio is connected to an antenna 2230. The board may also use an SPI Bus interface 2222, I2C protocol 2223, or GPIO 2224, or all of them to control the various functions of the chipset. The chipset can write usage data 2241, toy settings, 2242, and audio data 2243 to an external flash memory 2040, receive input and output from a plurality of accelerometers 2250, regulate motor control 2260, LED and buttons 2270, and play audio files through a speaker 2281 connected through an amplifier 2280.

Figure 23:
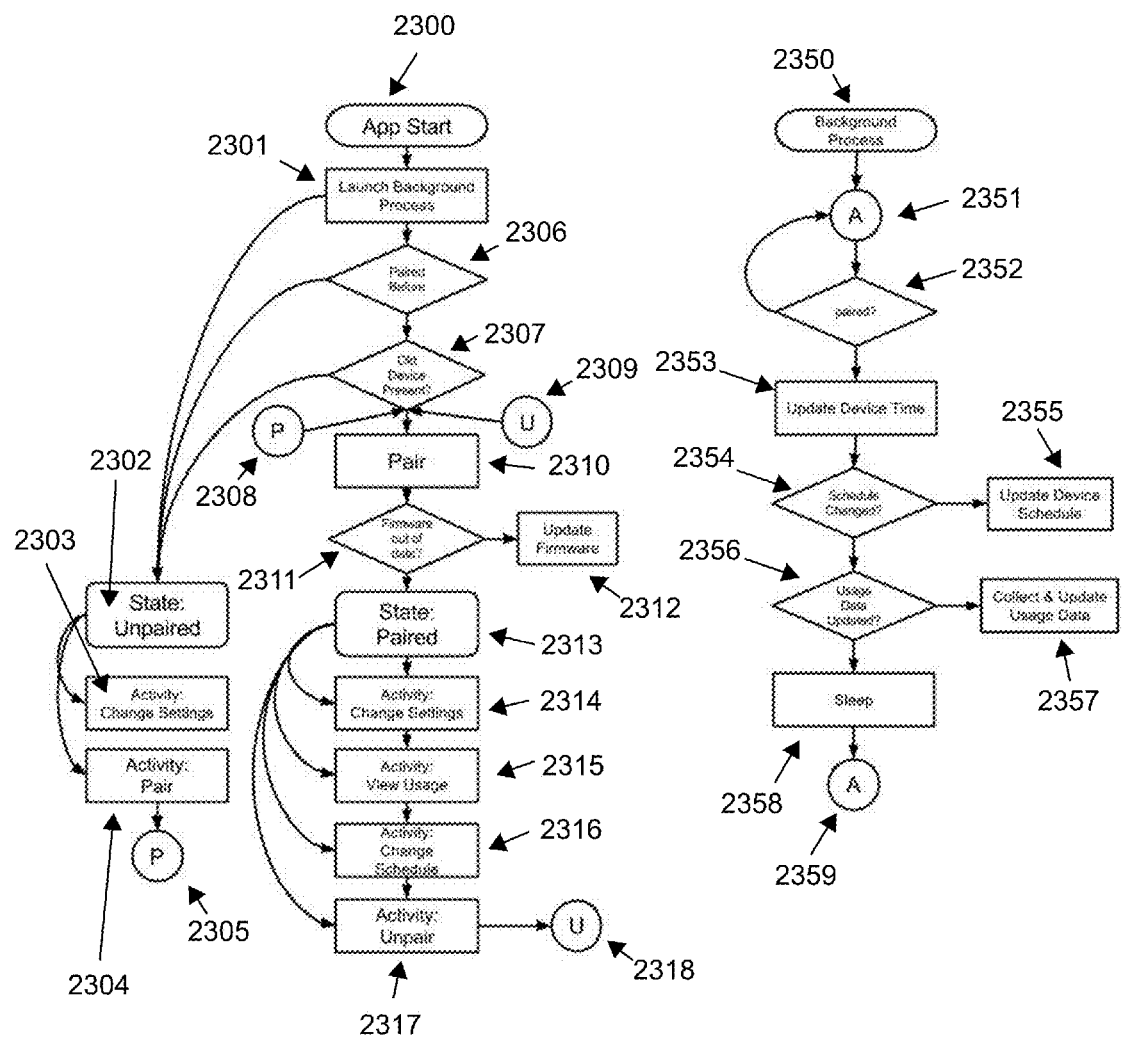
FIG. 23 shows a diagram flowchart for the APP flow in the preferred embodiment.

FIG. 23A shows a logical process flow diagram of the toy or device programmed behavior through a software app control system. The term toy and device are interchangeably used for the purposes of FIGS. 23A and 23B. The app launches a background process 2301, which can be seen in FIG. 23B in a greater detail, and checks whether the toy has been paired before or not 2306. If the toy has been previously paired 2311, the toy then checks for any new firmware updates 2312, and updates the firmware if a new version is available. In the paired state 2313 the toy allows the user to run the following activities: change settings 2314, view usage 2315, change schedule 2316, or unpair the device 2317. Unpairing the device at this stage will move the process logic to the unpaired stage 2318, the process of which is detailed in the Unpaired State diagram 2302.

In the unpaired state 2302, the user can change the settings 2303, or attempt to pair 2304 to a smartphone or tablet, which leads to the paired state logic 2305.

FIG. 23B shows the process flow diagram for the background process 2301 in a greater detail. The background process primarily runs basic tasks including updating the correct time in the chipset 2353, checking for changes in the schedule 2354, which then updates the device schedule 2355 if it detects a change in the schedule. The device then checks for any changes in usage data, at which point it will collect and update usage data 2357 if any changes are present. Once all the background process is completed, the background process goes to sleep mode 2358 the application process moves to the main process in FIG. 23A.

Figure 24:
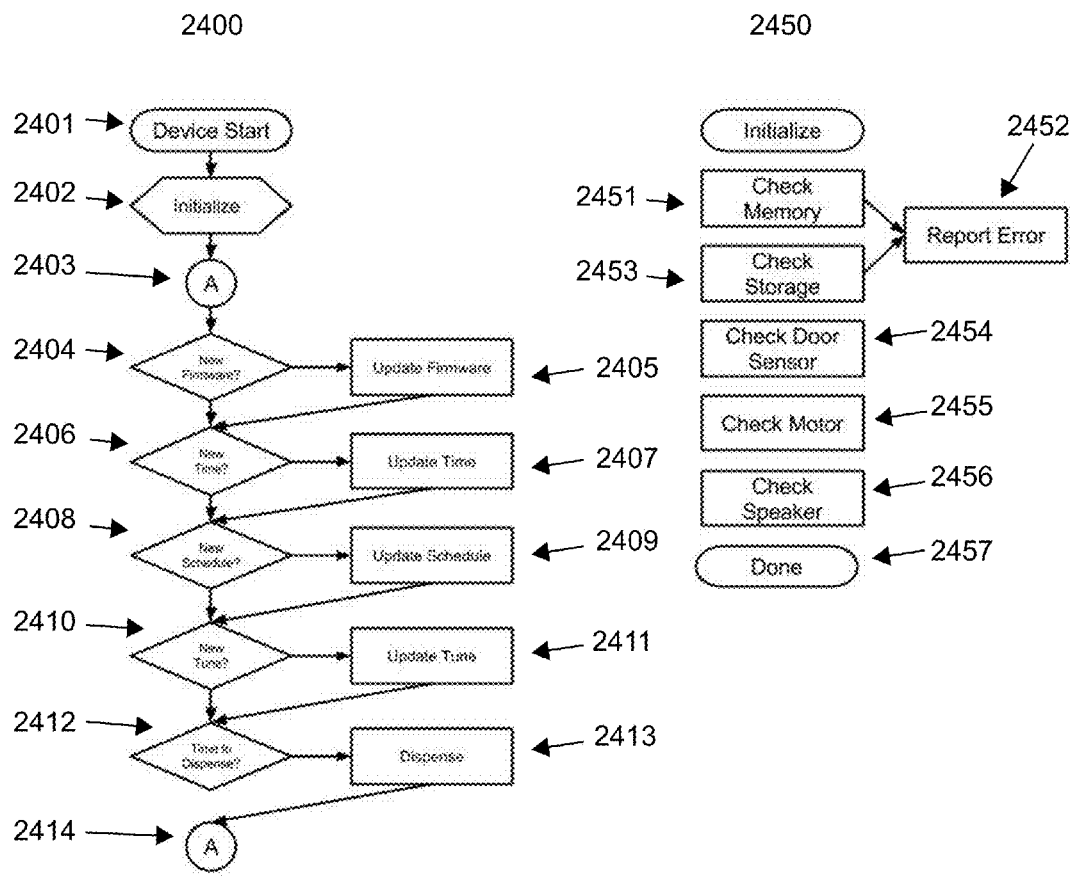
FIG. 24 shows a diagram flowchart for the device flow in the preferred embodiment.

FIG. 24A and FIG. 24B represents an alternate embodiment of the logic process of the chipset within the puzzle pet toy. In FIG. 24A, the device powers up 2401, and goes through an initialization process that is detailed in FIG. 24B. The initialization process checks for memory 2451, storage 2453, and reports any error to the chipset 2452. The initialization process also checks for the door sensor 2454, motor 2455, and speaker 2456, and completes the check 2457 if all components are functioning as it should. If there is an error, then the device reports back the error to the user either through an error sound, or an error light, or both.

Once the device has successfully run through its initialization process, the device receives input from the software application 2403 and goes through the input in a serial manner. The device first checks for any firmware update, 2404, and updates the firmware 2505 if there is a new firmware available for the device. The device then checks for current time and date 2406, and synchronizes to the appropriate time and date 2407 if necessary. After the time is set, the device then checks for any changes in the dispensing schedule 2408, and updates the schedule 2409 if there is any new changes in the dispensing schedule.

Figure 25:
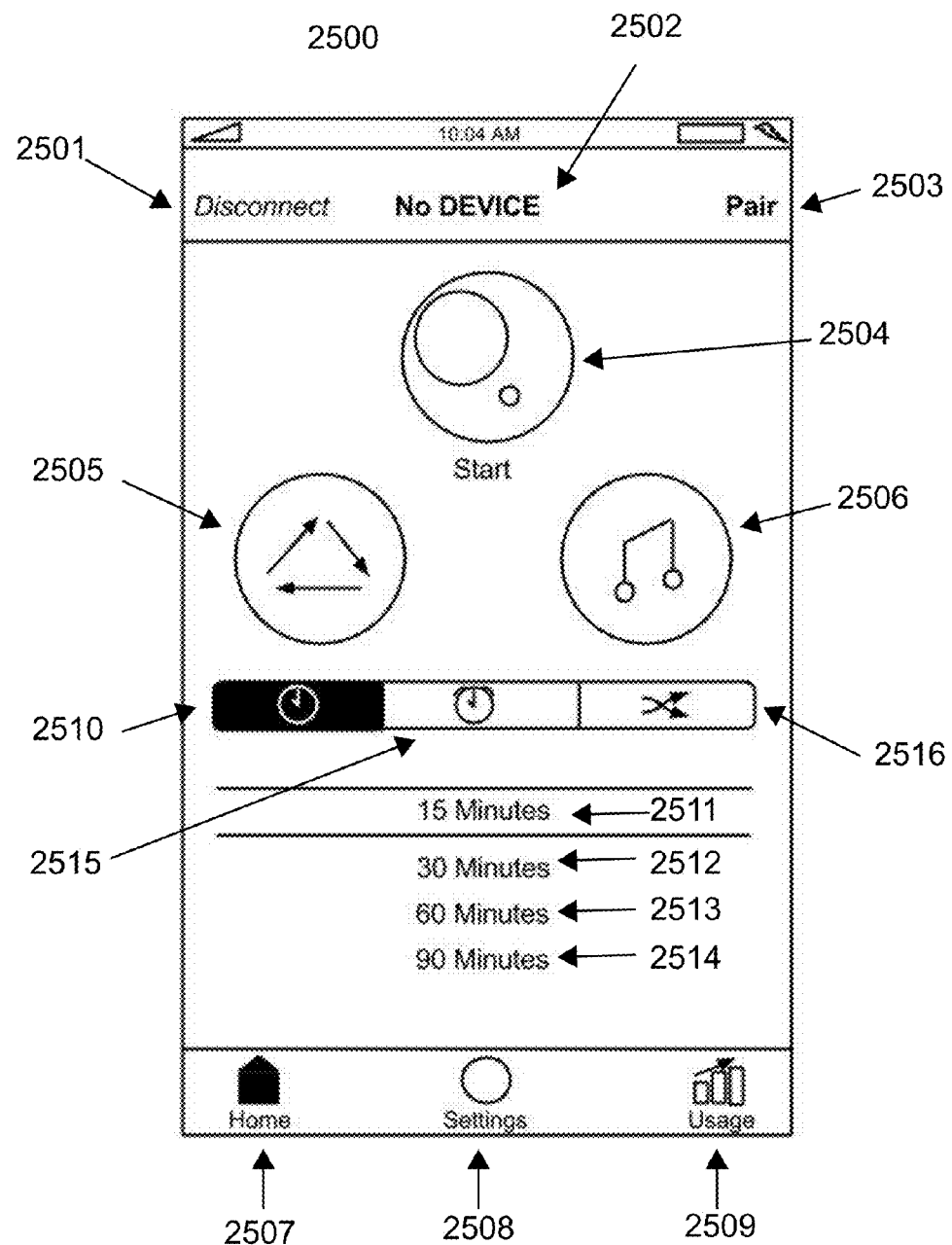
FIG. 25 shows a diagram flowchart in the UNPAIRED mode feature in the preferred embodiment.

FIGS. 25-32 show a possible embodiment of a mobile device app interface to control the features of the puzzle pet toy. FIG. 25 shows a possible main menu for the control interface on a smart phone. The interface may comprise of an action bar including a disconnect 2501 and pair 2503 buttons, and the action bar showing which device is being connected to the smart phone device 2502. It should be noted that FIGS. 25-32 are illustrations of a possible embodiment of the software app interface and not meant to be a limitation of the claims.

FIG. 25 shows a screenshot of a possible embodiment of the app interface 2500, showing the Status: Connectivity (Connected/Disconnected) 2501, the Device Name 2502, the Pairing Status 2503 (pair/unpair), a Start radio button 2504 to start the activity of the toy, a Radio button for setting duration of activity 2505, a Radio Button for ring tone or sound 2506, a Radio Button indicating the app's Home screen 2507, a Radio Button to change the settings 2508, a Radio Button to indicate the usage of the toy 2509 at the bottom, Settings for setting a specified time interval 2510 with the selected region 2510 selected with a drop down menu of 2511 through 2514 displayed, Settings for setting a scheduled time 2511, Settings for setting a random time(s) 2512.

Figure 26:
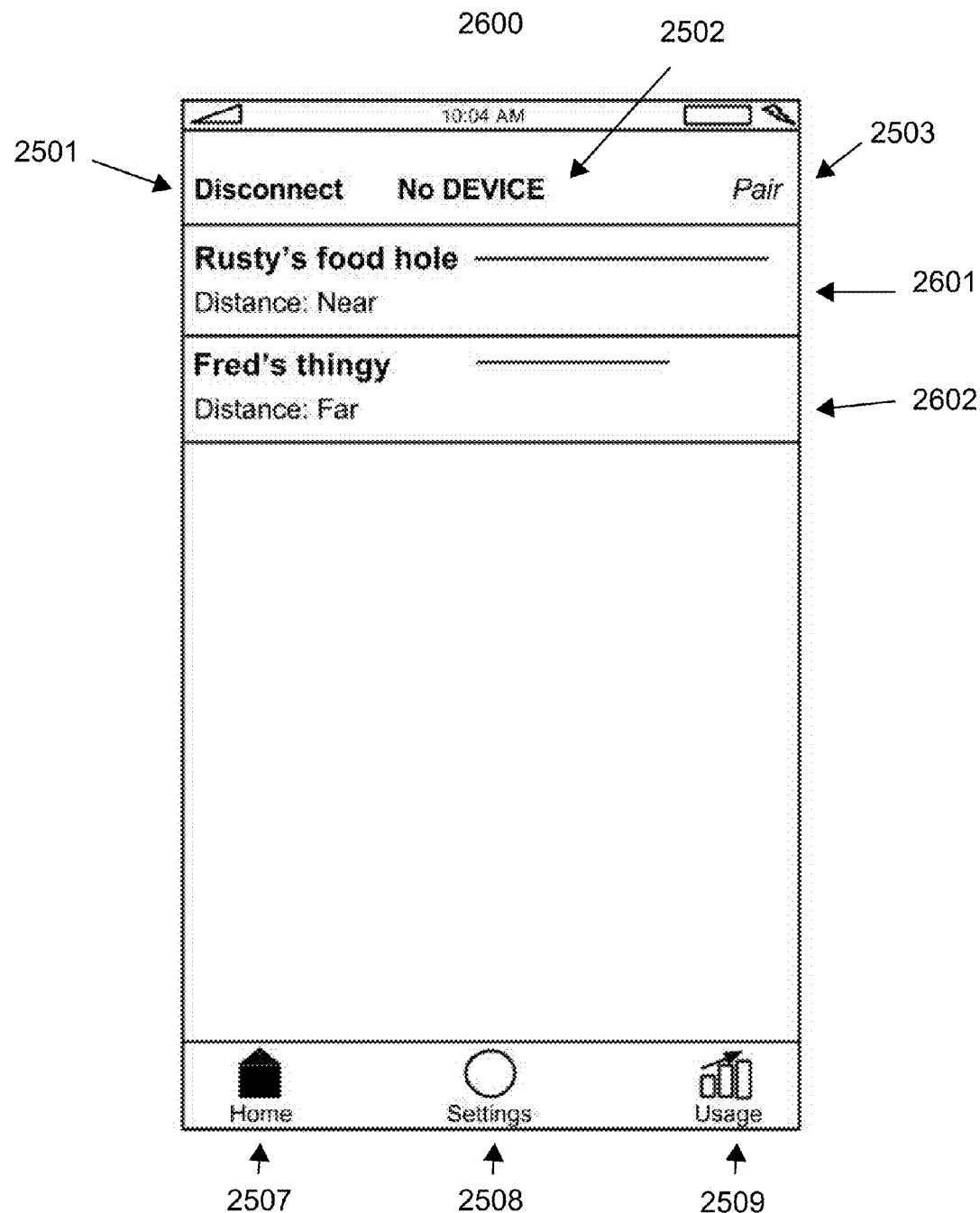
FIG. 26 shows a diagram flowchart in the PAIRED mode feature in the preferred embodiment.

FIG. 26 shows a screenshot of the app interface displaying the available puzzle pet toys within the vicinity of the smart mobile device that can connect to the smart mobile device 2600. The list may include the name of the puzzle pet toy, and also an estimate of the distance of a nearly detected example puzzle pet toy called "Rusty's food hole" 2601, or another puzzle pet toy that is further away that in this example is identified as "Fred's thingy." 2602.

Figure 27:
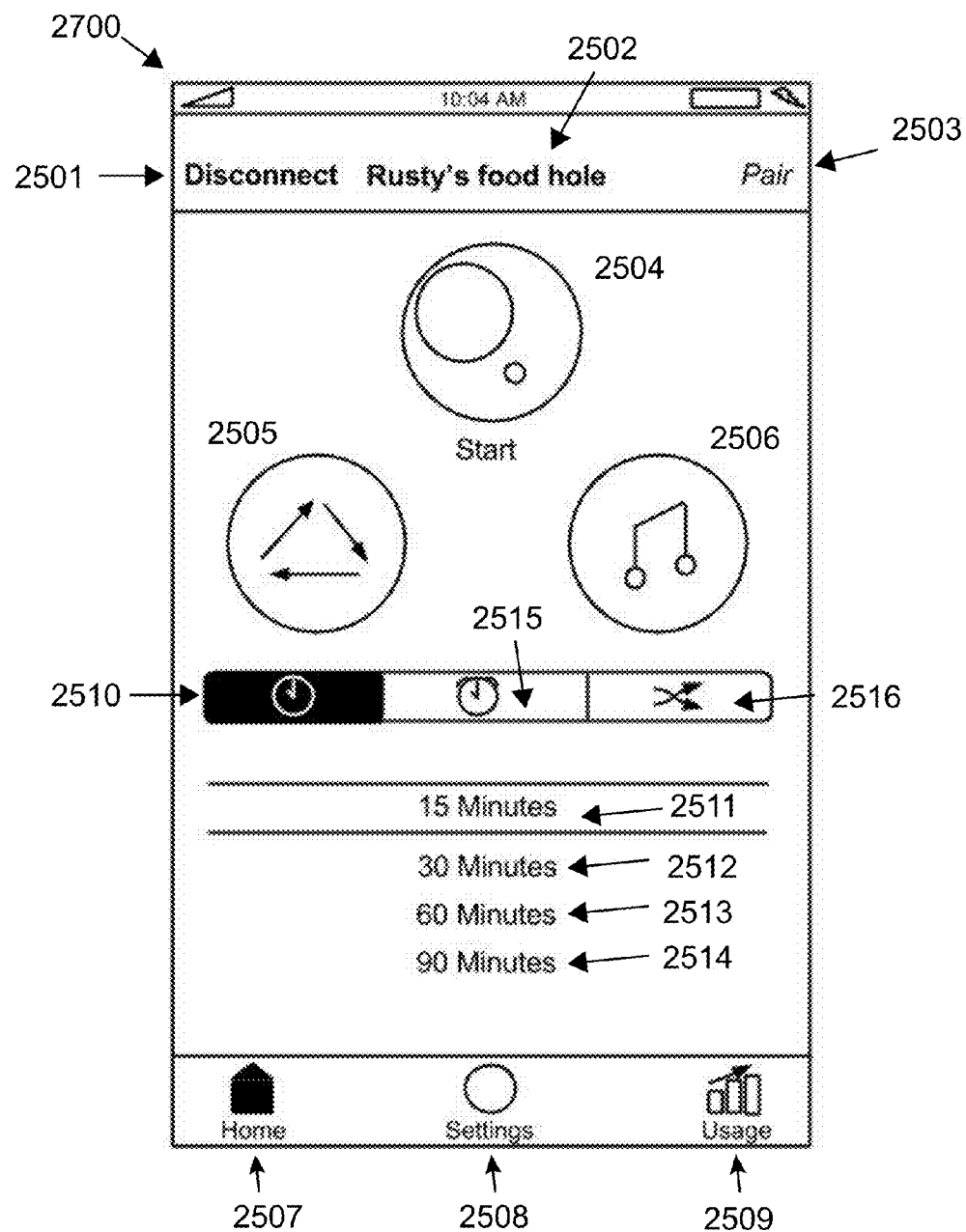
FIG. 27 shows an in-APP view of the INTERVAL mode setting screen within the APP illustrating a feature in the preferred embodiment.

FIG. 27 shows a screenshot of the app interface 2700, and within status Named Device Status bar 2502. For illustration purposes, a device called "Rusty's food hole" 2702 is available within the app for changing any of the settings previously mentioned in FIGS. 25 and 26 with the selected region 2510 selected with a drop down menu of 2511 through 2514 displayed.

Figure 28:
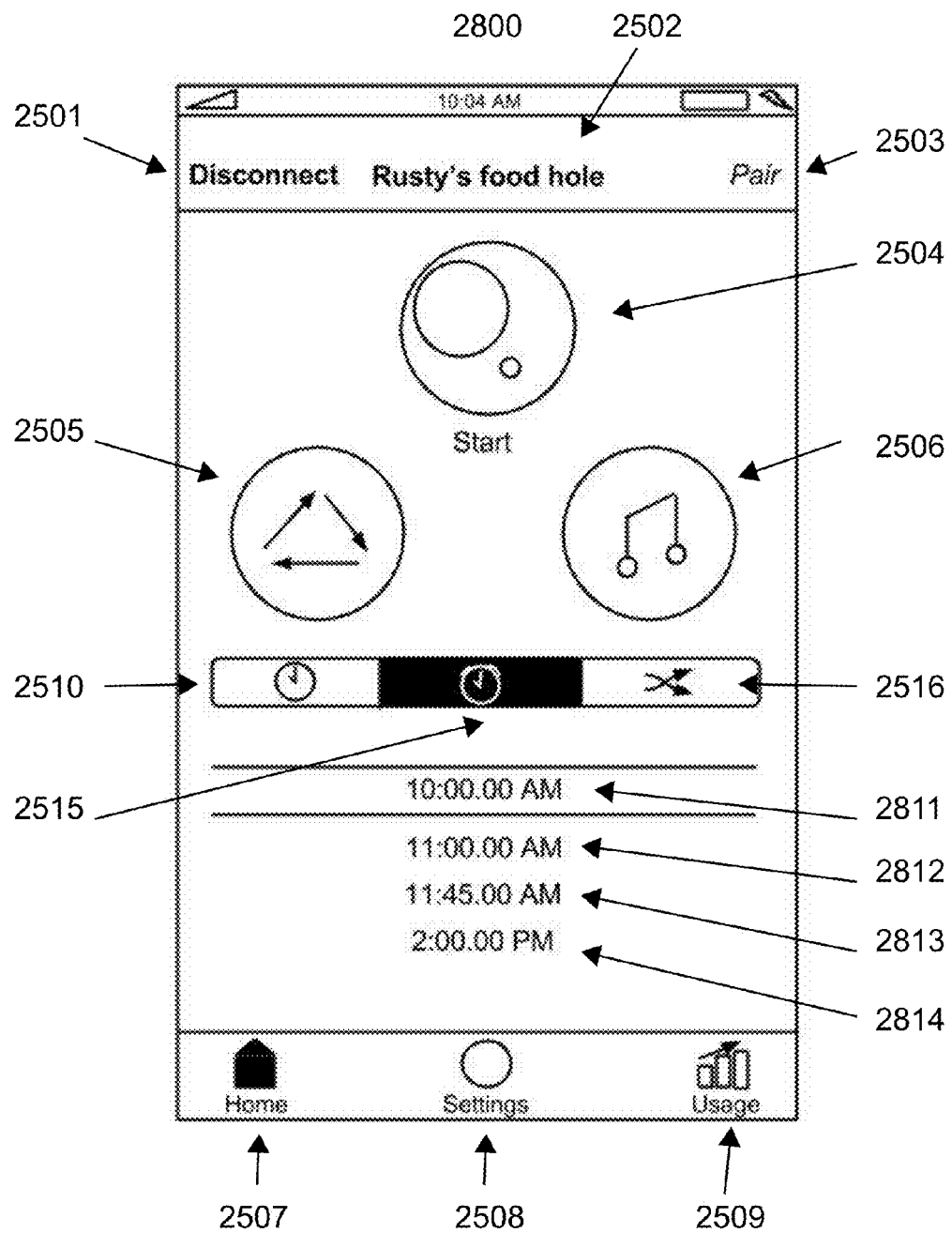
FIG. 28 shows an in-APP view of the SCHEDULE mode settings screen within the APP illustrating a feature in the preferred embodiment.

FIG. 28 shows a screenshot of the app interface 2800, where the selected region 2515 is selected, indicating a drop down menu for Time of Day settings for the user to choose, for example—10:00.00 AM 2811, Time of Day—11:00.00 AM 2812, Time of Day—11:45.00 AM 2813, and Time of Day—2:00.00 PM 2814.

Figure 29:
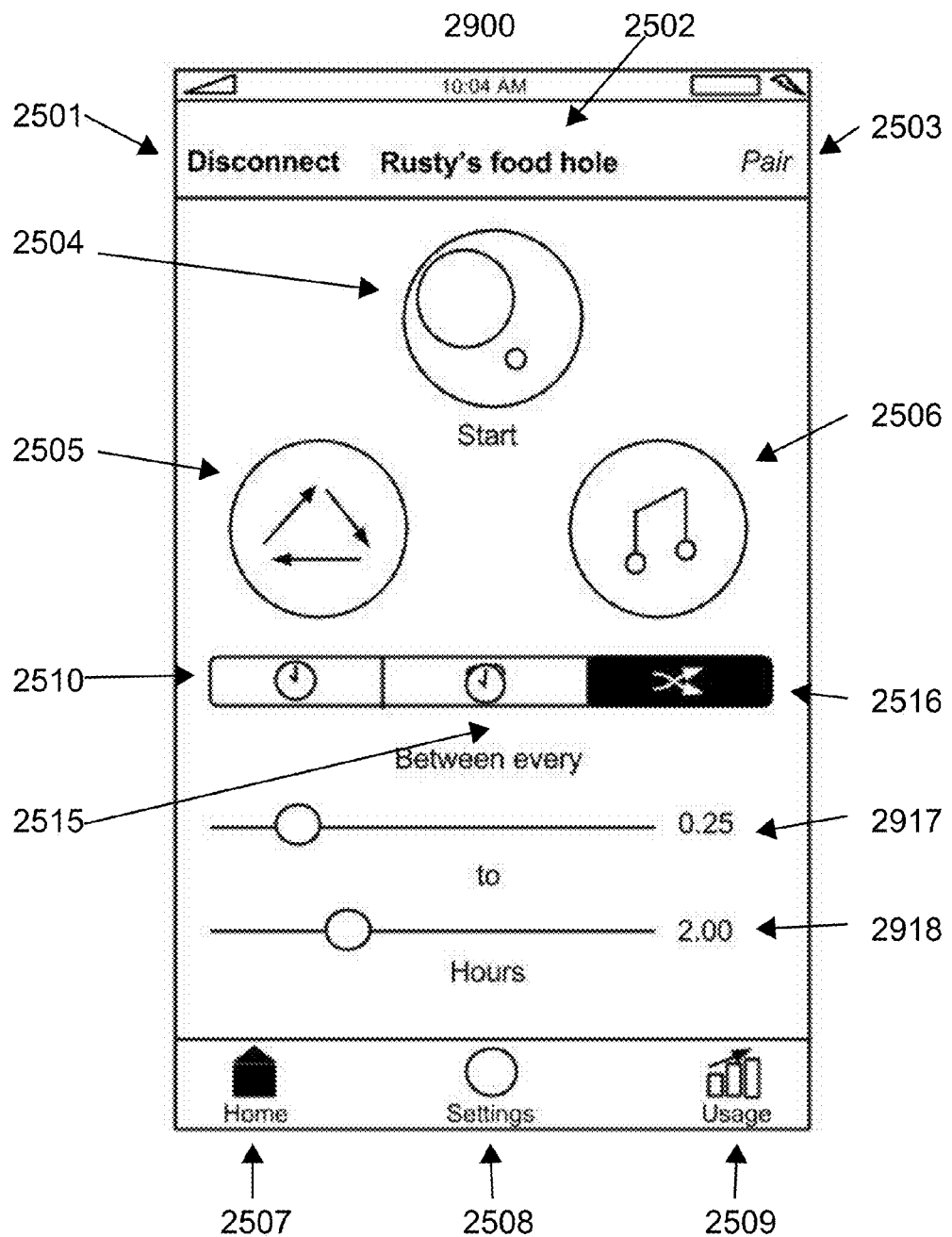
FIG. 29 shows an in-APP view of the RANDOM mode settings screen within the APP illustrating a feature in the preferred embodiment.

FIG. 29 shows a screenshot of the app Interface 2900, where selected region 2515 is selected, indicating a drop down menu for Interval Time Settings 2516, with drop down menu for Minimum interval time 2917 and Maximum Interval Time 2918.

Figure 30:
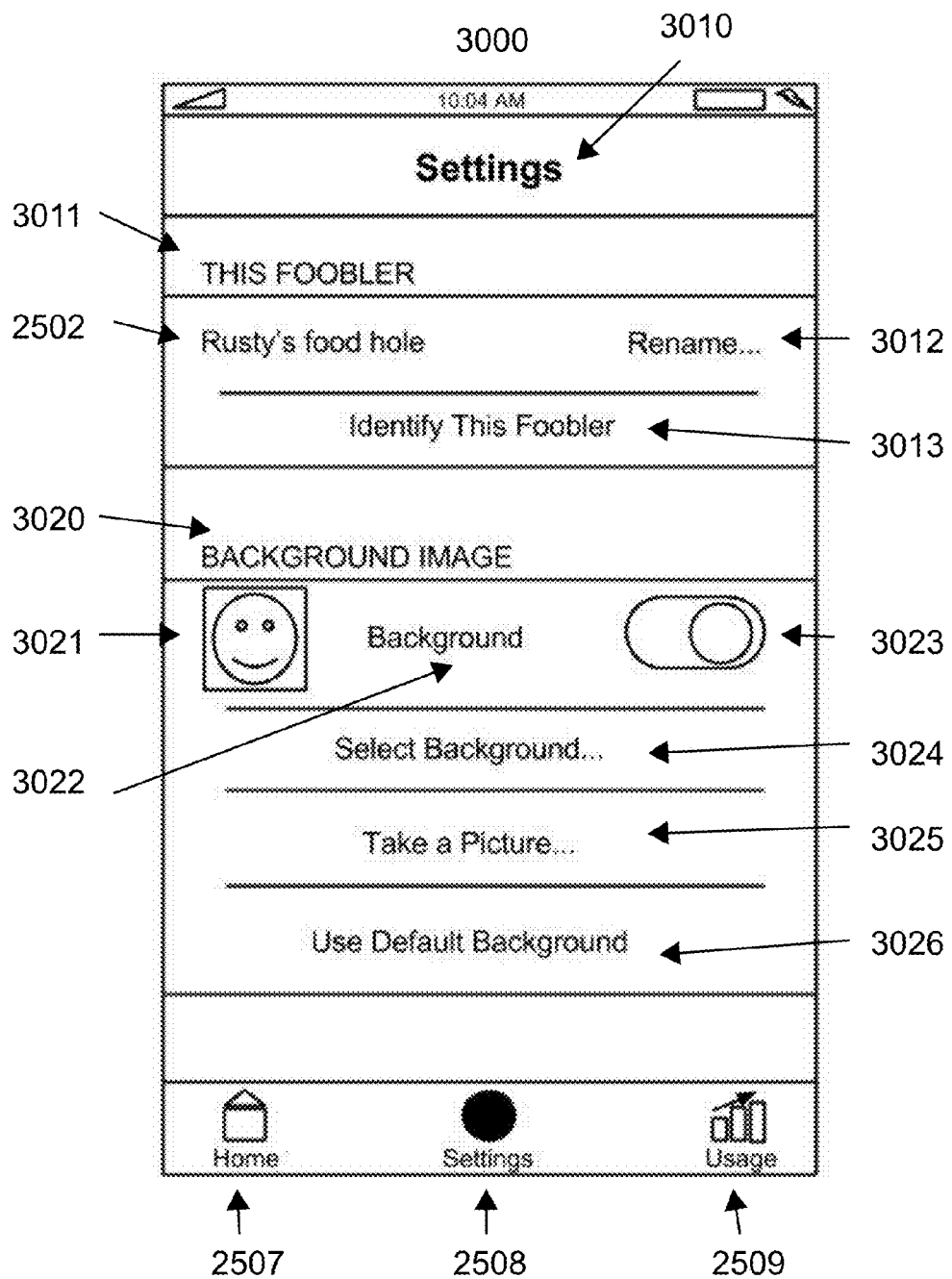
FIG. 30 shows an in-APP view of part of the SETTINGS screen within the APP illustrating the settings panel in the preferred embodiment.

FIG. 30 shows a screenshot of the app interface 3000, the Settings Menu 3010 (selected), for THIS DEVICE (Device Name) 3011, currently selected is 2502 "Rusty's Food hole", and Radio Button—For renaming device 3012, Radio Button—identify this device (pet toy) 3013, Settings—Background Image 3020, Background images choices radio button 3021, Settings Background 3022, Settings—Radio Button on and off 3023, Settings—Select Background 3024, Settings—Take a picture 3025, Settings—Use Default Background 3026

Figure 31:
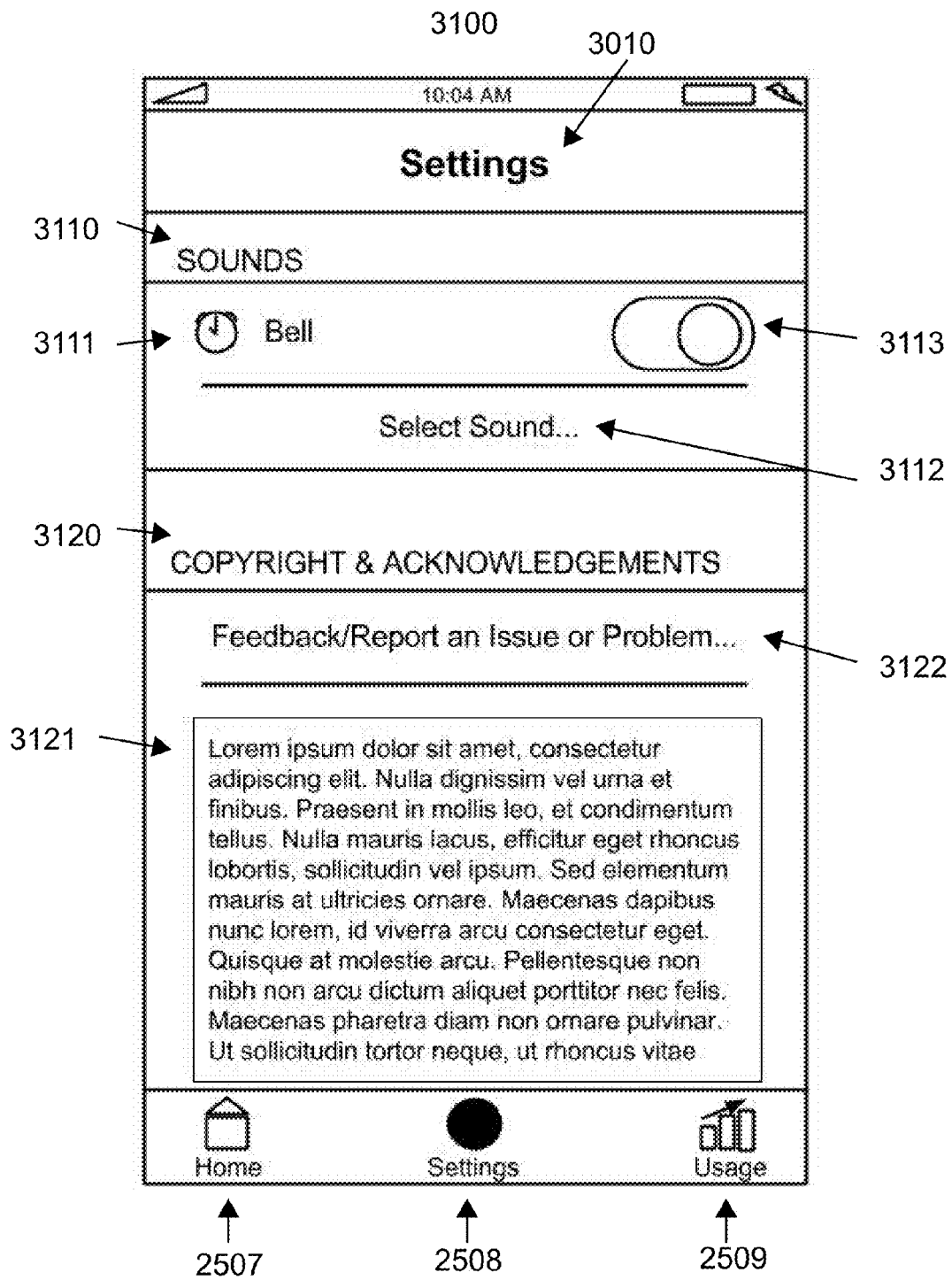
FIG. 31 shows an in-APP view of part of the SETTINGS screen with within the APP illustrating the settings panel in the preferred embodiment.

FIG. 31 shows a screenshot of the app's settings screen (continued down/scroll down within the app interface) 3100, settings for sounds 3110, settings for the Bell 3111, Settings—for selecting a sound "Select Sound" 3112, Settings for Radio Button on/off 3113, Settings menu for Copyright and Acknowledgements (and other legal information) 3120, Settings menu for viewing Multiple languages of Copyright and Acknowledgements 3121, Settings—for menu to give Feedback/Report an issue or problem 3122 for the device or app.

Figure 32:
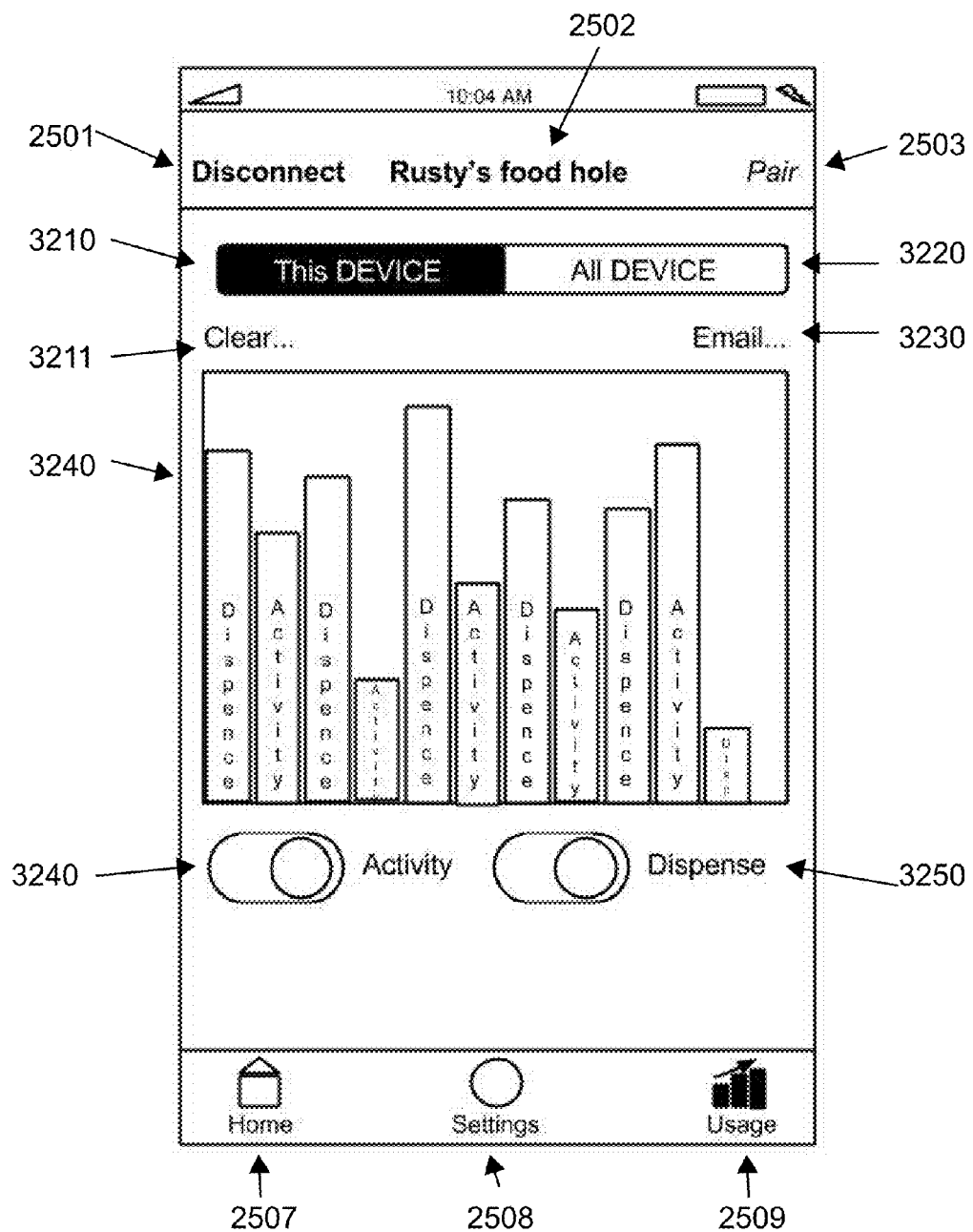
FIG. 32 shows a diagram flowchart of a training mode feature in the preferred embodiment.

FIG. 32 shows a screenshot of the app Interface showing a history of activity and dispensing tracked over time 3200. Users can see the history for the connected device 3210, or alternatively the user can see an aggregated data for all the devices that have been paired with the smart mobile device 3220. The user can clear and reset the data by pressing the clear button 3211. The user can also send the data displayed through e-mail or other similar communicative means 3230. The data is displayed as a bar graph showing the volume of activity and dispensation over time 3240. Users can also filter the bar graph to show either activity only 3240, dispense only 3250, or both.

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm, and whose upper limit is 100 mm.

Although the present invention has been described in considerable detail with reference to certain preferred versions thereof, other versions are possible. Therefore, the spirit and scope of the appended claims should not be limited to the description of the preferred version contained herein.

What is claimed:

1. A puzzle pet toy and treat dispenser, comprising:
   a. A motor assembly at the base of said pet toy and treat dispenser, said motor assembly comprising a power source, said power source connected to at least one motor, said motor connected to a printed circuit board (PCB), said PCB further comprising a power switch, LED indicator, accelerometer, and timer settings, said motor connected to a drivetrain, said drivetrain connected to a clutch, said clutch connected to a driveshaft;
   b. An inner chamber, said inner chamber comprising a base, said base connected to a plurality of vertical radial walls dividing said inner chamber into separate containers, said separate containers each comprising a tangential wall, and said each tangential wall comprising an opening;
   c. A drum aperture, said drum aperture comprising a base and vertical wall with a substantially cylindrical shape, said base further comprising a drive shaft receiver and a plurality of actuators on the external surface of said base, said vertical wall further comprising an opening vertically aligned to the height of the radial wall of said separate containers;
   d. A lid, said lid comprising a plurality of dividers on an internal surface of the lid that is aligned with said vertical radial walls in said inner chamber;
   e. A housing, said housing comprising a receptacle at the base of the housing to receive said motor assembly, said housing comprising at least one opening to allow at least one treat to be dispensed from the toy;
   f. An external chamber, formed by the internal surface of said housing and the external surface of the drum aperture;
   g. An amplifier, connected to the PCB;
   h. A speaker, connected to the amplifier; wherein,
   i. The puzzle pet toy is controlled via wireless communications.

2. A puzzle pet toy and treat dispenser of claim 1, where said motor assembly further comprising a noisemaker to attract pets to play with the toy.

3. A puzzle pet toy and treat dispenser of claim 2, where said noisemaker is a mechanical bell assembly.

4. A puzzle pet toy and treat dispenser of claim 2, where said noisemaker is a digital prerecorded sound player.

5. A puzzle pet toy and treat dispenser of claim 1, where said housing, said drum aperture, and said lid are made from food-grade plastic materials.

6. A puzzle pet toy and treat dispenser of claim 1, where said vertical wall further comprising a plurality of fins aligned along the inner wall of the curvature of said inner surfaces of said housing.

7. A puzzle pet toy and treat dispenser of claim 1, wherein the puzzle pet toy is controlled wirelessly with Bluetooth.

8. A puzzle pet toy and treat dispenser of claim 7, wherein the puzzle pet toy has a firmware is updated with Bluetooth.

9. A puzzle pet toy and treat dispenser of claim 7, wherein the settings of the puzzle pet toy are controlled by the user with a Bluetooth enabled smart mobile device.

10. A puzzle pet toy and treat dispenser of claim 7, where the settings of the puzzle pet toy are controlled by the user with a wireless remote.

11. A puzzle pet toy and treat dispenser of claim 7, wherein the accelerometer provides acceleration activity data of the pet to an application to determine release of at least one treat.

12. A puzzle pet toy and treat dispenser of claim 7, wherein the puzzle pet toy audibly entertains the pet by playing audible noises selected from the group consisting of live sounds, pre-recorded sounds or music.

* * * * *